United States Patent
Chou et al.

(10) Patent No.: US 10,675,681 B2
(45) Date of Patent: Jun. 9, 2020

(54) CORE SHELL

(71) Applicant: HONDA MOTOR CO., LTD., Minato-ku, Tokyo (JP)

(72) Inventors: Nam Hawn Chou, Dublin, OH (US); Ryan McKenney, Upper Arlington, OH (US); Christopher Brooks, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 3 days.

(21) Appl. No.: 15/886,635

(22) Filed: Feb. 1, 2018

(65) Prior Publication Data

US 2018/0214945 A1    Aug. 2, 2018

Related U.S. Application Data

(60) Provisional application No. 62/453,877, filed on Feb. 2, 2017.

(51) Int. Cl.
*B22F 1/00* (2006.01)
*H01M 8/1007* (2016.01)
(Continued)

(52) U.S. Cl.
CPC .......... *B22F 1/0044* (2013.01); *B01J 23/626* (2013.01); *B01J 23/628* (2013.01); *B01J 23/72* (2013.01); *B01J 23/745* (2013.01); *B01J 23/75* (2013.01); *B01J 23/755* (2013.01); *B22F 1/0018* (2013.01); *B22F 1/02* (2013.01); *C25B 1/00* (2013.01);
(Continued)

(58) Field of Classification Search
CPC ....... B22F 1/0018; B22F 1/0044; B01J 23/38; B01J 23/40; B01J 23/42; B01J 23/44; B01J 23/48; B01J 23/52; B01J 23/892
See application file for complete search history.

(56) References Cited

U.S. PATENT DOCUMENTS

| 4,897,167 A | 1/1990 | Cook et al. |
| 5,489,449 A * | 2/1996 | Umeya ............... B01J 8/42 427/213 |

(Continued)

FOREIGN PATENT DOCUMENTS

| CN | 101931081 B | 3/2012 |
| CN | 105080564 A | 11/2015 |

(Continued)

OTHER PUBLICATIONS

Machine translation of Zhang (CN106345489A), publication date Jan. 25, 2017.*

(Continued)

*Primary Examiner* — Jun Li
(74) *Attorney, Agent, or Firm* — Arent Fox LLP

(57) ABSTRACT

Multifunctional core@shell nanoparticles (CSNs) useful in electrochemical cells, particularly for use as an electrocatalyst material. The multifunctional CSNs comprise a catalytic core component encompassed by one or more outer shells. Also included are electrochemical cell electrodes and electrochemical cells that electrochemically convert carbon dioxide to, for example, useful fuels (e.g., synthetic fuels) or other products, and which comprise multifunctional CSNs, and methods for making the same.

15 Claims, 23 Drawing Sheets

(51) Int. Cl.

| | | |
|---|---|---|
| *B01J 23/72* | (2006.01) | |
| *B01J 23/62* | (2006.01) | |
| *B01J 23/75* | (2006.01) | |
| *B01J 23/755* | (2006.01) | |
| *B01J 23/745* | (2006.01) | |
| *C25B 1/00* | (2006.01) | |
| *C25B 11/04* | (2006.01) | |
| *C25B 3/04* | (2006.01) | |
| *B22F 1/02* | (2006.01) | |

(52) U.S. Cl.
CPC ............... *C25B 3/04* (2013.01); *C25B 11/04* (2013.01); *H01M 8/1007* (2016.02); *B22F 2001/0029* (2013.01); *Y02A 50/2342* (2018.01)

(56) References Cited

U.S. PATENT DOCUMENTS

| | | | | |
|---|---|---|---|---|
| 6,582,763 | B1* | 6/2003 | Nishimura | B22F 1/02 427/216 |
| 8,609,187 | B1* | 12/2013 | Kang | C22C 19/058 427/190 |
| 9,255,335 | B2 | 2/2016 | Kanan et al. | |
| 9,620,786 | B2* | 4/2017 | Cho | B22F 1/025 |
| 2003/0215638 | A1 | 11/2003 | Charnay et al. | |
| 2007/0281160 | A1* | 12/2007 | Krishna | B01D 69/02 428/403 |
| 2009/0169892 | A1 | 7/2009 | Bazzi et al. | |
| 2009/0252871 | A1* | 10/2009 | Coiffic | B01D 67/0034 427/243 |
| 2009/0269269 | A1 | 10/2009 | White et al. | |
| 2009/0293348 | A1 | 12/2009 | Olah et al. | |
| 2010/0056366 | A1* | 3/2010 | Lee | B01J 21/063 502/300 |
| 2012/0183869 | A1* | 7/2012 | Jin | H01M 4/8657 429/405 |
| 2013/0228470 | A1 | 9/2013 | Chen | |
| 2014/0106260 | A1 | 4/2014 | Cargnello et al. | |
| 2015/0017565 | A1 | 1/2015 | Adzic et al. | |
| 2015/0072853 | A1 | 3/2015 | Rahman et al. | |
| 2015/0345034 | A1 | 12/2015 | Sundara et al. | |
| 2016/0193595 | A1 | 7/2016 | Nagpal et al. | |

FOREIGN PATENT DOCUMENTS

| | | |
|---|---|---|
| CN | 105304910 A | 2/2016 |
| CN | 105420751 A | 3/2016 |
| CN | 106345489 A | 1/2017 |
| JP | 2012-188707 A | 10/2012 |
| KR | 20150051249 A | 5/2015 |
| WO | WO 2012/082717 A2 | 6/2012 |
| WO | WO 2016/053637 A1 | 4/2016 |
| WO | WO 2016/054400 A1 | 4/2016 |

OTHER PUBLICATIONS

Gawande (Core-Shell Nanoparticles:Synthesis and Applications in Catalysis and Electrocatalysis, Chem. Soc. Rev, 2015, 44, p. 7540-7590).*

Recep Kas et al., "Electrochemical CO2 reduction on Cu2O-derived copper nanoparticles: Controlling the catalytic selectivity of hydrocarbons" Physical Chemistry Chemical Physics, pp. 12194-12201 2014.

Sujat Sen et al., "Electrochemical Reduction of CO2 at Copper Nanofoams" ACS Catalysis pp. 3091-3095, 2014.

Chen Huai, "Cu@Cu2P@CuO Graded Nanowire Heterostructures for CO2 Reduction" Department of Materials Science and Engineering University of Toronto, 2014.

Written Opinion and Inernational Search Report of related foreign application PCT/US2018/016682 dated Apr. 13, 2018.

* cited by examiner (1) As-made (Cu)
(2) After 4 days ($Cu_2O$-major, Cu-minor)
(3) After 9 days ($Cu_2O$-major, Cu-minor)

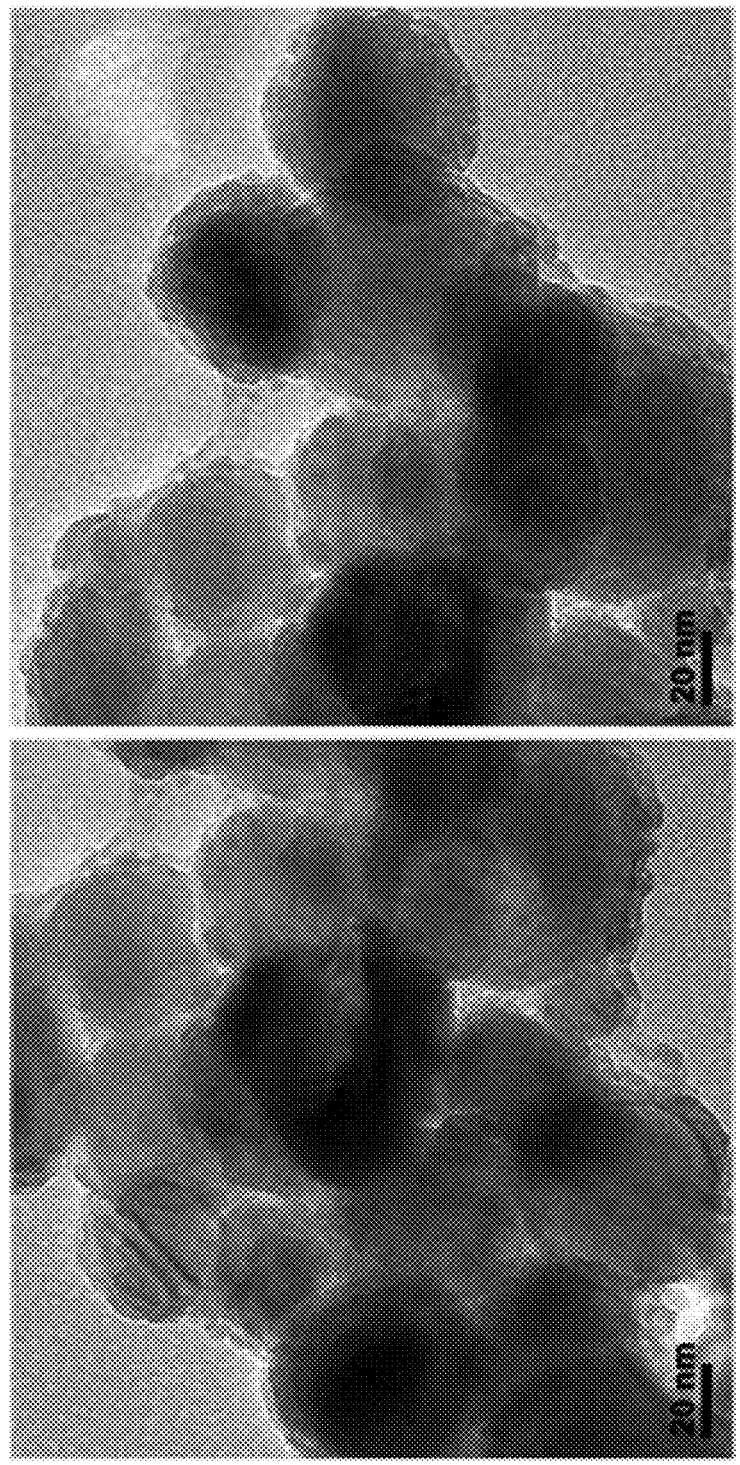

Note: XRD patterns in higher angle can be assigned to either $Cu_2O$ or $CuO$.

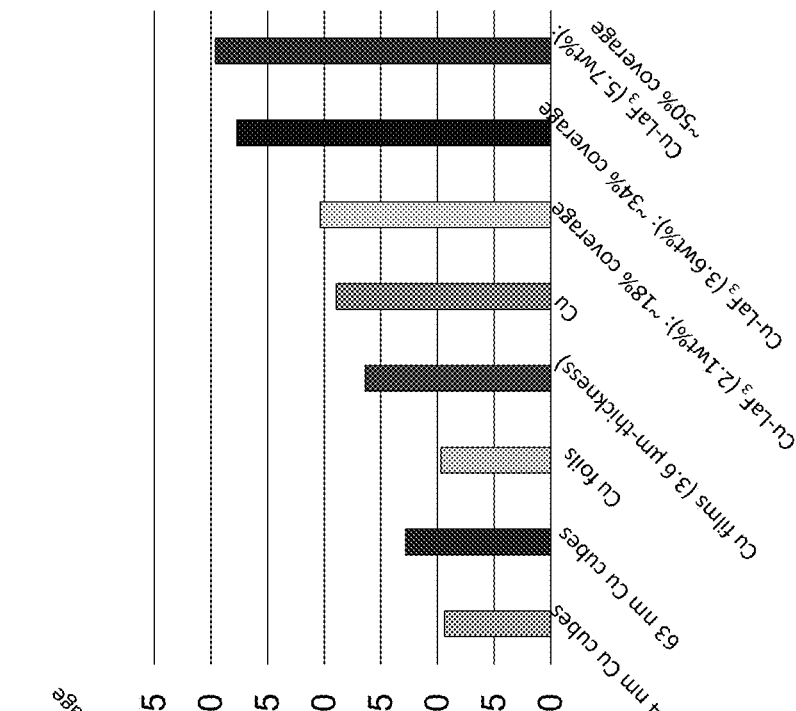
FIG. 19B
Alcohols Products (HPLC)
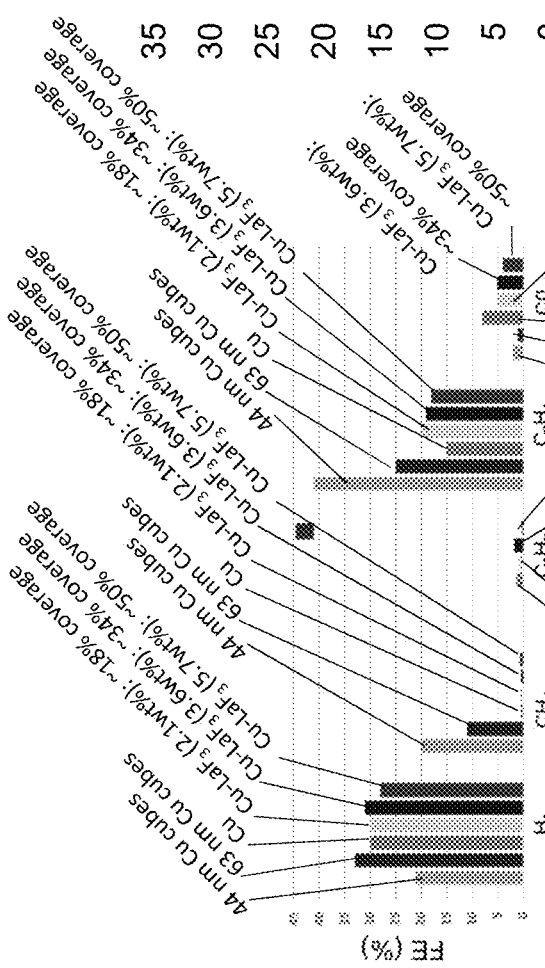
FIG. 19A
Gas Products (GC)
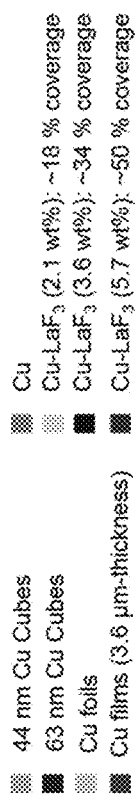

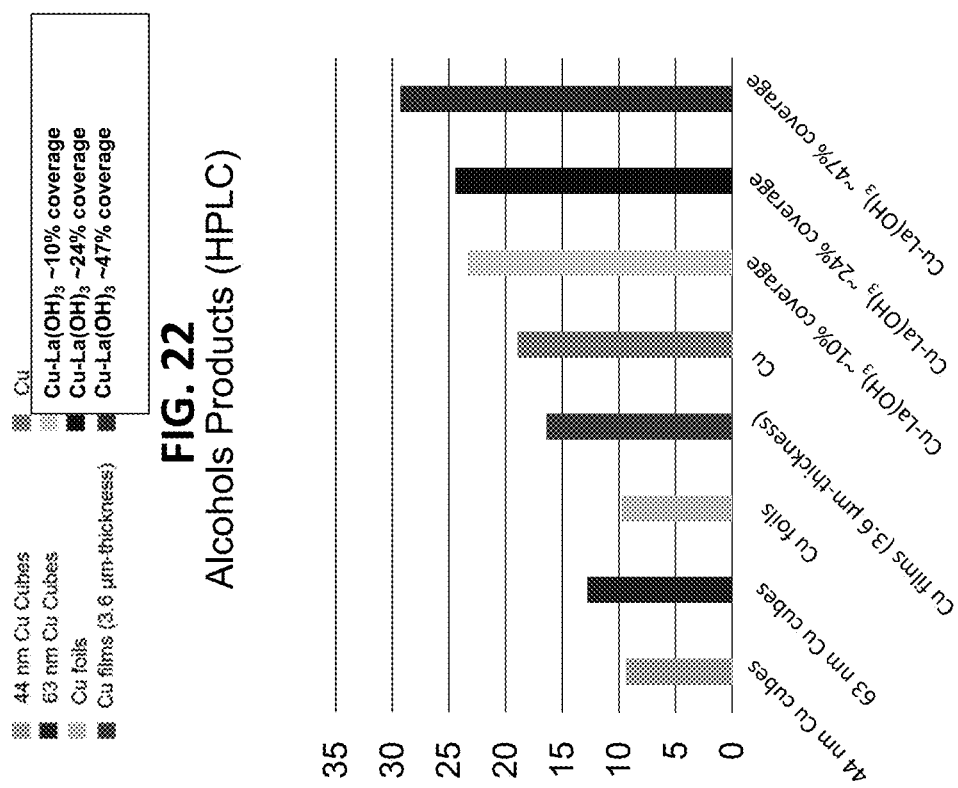

CORE SHELL

CROSS REFERENCE TO RELATED APPLICATIONS

This application claims priority from U.S. Provisional Patent Application No. 62/453,877, filed on Feb. 2, 2017, the disclosure of which is herein incorporated by reference in its entirety.

FIELD OF THE INVENTION

The present disclosure relates generally to electrochemical cells used to convert carbon dioxide into useful products. The electrochemical cells include electrodes having multifunctional core@shell nanoparticles that provide a high level of catalytic activity, product selectivity, and stability, and methods for making the same.

BACKGROUND

Electrochemical systems that reduce carbon dioxide when energized provide an attractive power source option as they are able to not only offset emissions of carbon dioxide (the primary greenhouse gas), but also convert carbon dioxide into fuels and other useful products. However, this type of electrochemical cell poses major technological challenges, such as low catalytic activity, product selectivity, and stability of electrodes used in this type of system, among others. While almost all pure metals and their alloys have been investigated for use as electrocatalysts in carbon dioxide reduction, no electrode material presently exists that overcomes all of the above-mentioned challenges. As such, there is a need in the art for electrode materials that provide a high level of catalytic activity, product selectivity, and stability.

SUMMARY OF THE INVENTION

The present disclosure relates generally to multifunctional core@shell nanoparticles (CSNs) which are useful in electrochemical cells, particularly for use as an electrocatalyst material. The multifunctional CSNs according to the present disclosure comprise a catalytic core component encompassed by one or more outer shells. The present disclosure also relates generally to electrochemical cell electrodes and electrochemical cells that electrochemically convert carbon dioxide to, for example, useful fuels (e.g., synthetic fuels) or other products, and which comprise the multifunctional CSNs described herein.

The present disclosure also relates generally to methods of making the multifunctional CSNs described herein.

The present disclosure also relates generally to methods of chemically reducing $CO_2$. According to some aspects, the method may comprise providing an electrochemical cell comprising an anode, a cathode, and a liquid electrolyte, wherein the cathode comprises an electrocatalytic component including at least one CSN according to the present disclosure, providing a $CO_2$ source, and reducing the $CO_2$.

BRIEF DESCRIPTION OF THE DRAWINGS

FIGS. 9A and 9B are transmission electron microscopy (TEM) images of Cu—LaF3 CSNs of Experimental Example 1, as-made.

FIG. 19A shows gas products produced by catalysts studied in Experimental Example 4.

FIG. 19B shows alcohol products produced by catalysts studied in Experimental Example 4.

FIG. 22 shows alcohol products produced by catalysts studied in Experimental Example 5.

DETAILED DESCRIPTION OF THE INVENTION

The present disclosure relates generally to multifunctional CSNs which are useful in electrochemical cells, particularly for use as an electrocatalyst material. The multifunctional CSNs according to the present disclosure may comprise a catalytic core component encompassed by one or more outer shells. The present disclosure also relates generally to electrochemical cell electrodes and electrochemical cells that electrochemically convert carbon dioxide to other products, and which comprise the multifunctional CSNs described herein.

The present disclosure also related generally to methods of making the multifunctional CSNs described herein.

As used herein, the term "CSN" refers to a nano-sized particle having a catalytic core component encompassed by one or more shells. The multifunctional CSNs of the present disclosure may advantageously have a multifunctional role in improving the effectiveness and/or efficiency of electrocatalytic reduction of carbon dioxide in electrocatalytic cells. For example, the multifunctional CSNs of the present disclosure may improve the effectiveness and/or efficiency of electrocatalytic reduction of carbon dioxide by providing a catalyst-containing electrode with a high level of catalytic activity, product selectivity, and/or stability.

The multifunctional CSNs according to the present disclosure comprise a catalytic core component encompassed by one or more outer shells, wherein the catalytic core component comprises one or more catalytic materials. As used herein, a "catalytic material" refers to a material useful for causing or accelerating (i.e., "catalyzing") a chemical reaction. For example, the catalytic material may be a material that, at least in part, catalyzes the conversion of carbon dioxide to, for example, useful fuels or other products.

Examples of catalytic materials useful according to the present disclosure include, but are not limited to, metals (e.g., copper, cobalt, iron, nickel, lead, and tin) and/or alloys and/or oxides thereof.

Figure 1C:
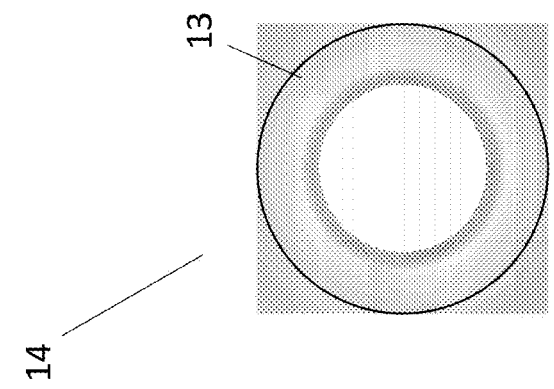
FIG. 1c is a cutaway schematic depicting an example hollow catalytic core component of a CSN, according to aspects of the present disclosure.

As used herein, the term "catalytic core component" refers to the inner part of a CSN. According to some aspects, the catalytic core component may be a solid core component. As used herein, the term "solid" means not hollow. As shown in FIG. 1a, the solid core component 10 may comprise one or more catalytic materials 11. For example, the solid core component may comprise a first catalytic material, such as a metal.

Figure 1B:
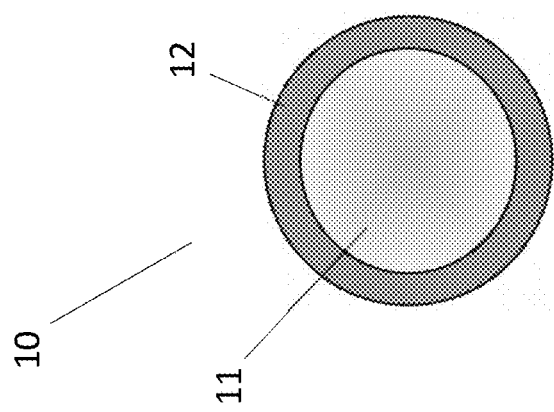
FIG. 1b is a cutaway schematic depicting an example solid catalytic core component of a CSN with a coating, according to aspects of the present disclosure.
Figure 1A:
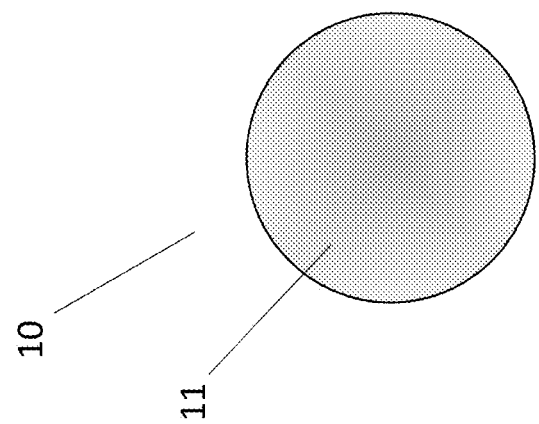
FIG. 1a is a cutaway schematic depicting an example solid catalytic core component of a CSN, according to aspects of the present disclosure.

As shown in FIG. 1b, the solid core component 10 may additionally comprise a second catalytic material 12 which coats the first catalytic material 11. For example, the coating may comprise a metal oxide. According to some aspects, the coating may be formed by heating the first catalytic material in air, electrochemically oxidizing an outer layer of the first catalytic material, and/or depositing a second catalytic material on the first catalytic material. The coating may provide complete coverage of the first catalytic material (i.e., cover 100% of the first catalytic material's surface area) or may provide partial coverage of the first catalytic material (i.e., cover less than 100% of the first catalytic material's surface area).

According to some aspects, the catalytic core component is not solid. For example, the catalytic core component may be hollow, such as a hollow sphere. As shown in FIG. 1c, the hollow core component 14 may comprise one or more catalytic materials 13. For example, the hollow core component may comprise a metal oxide.

Figure 2:
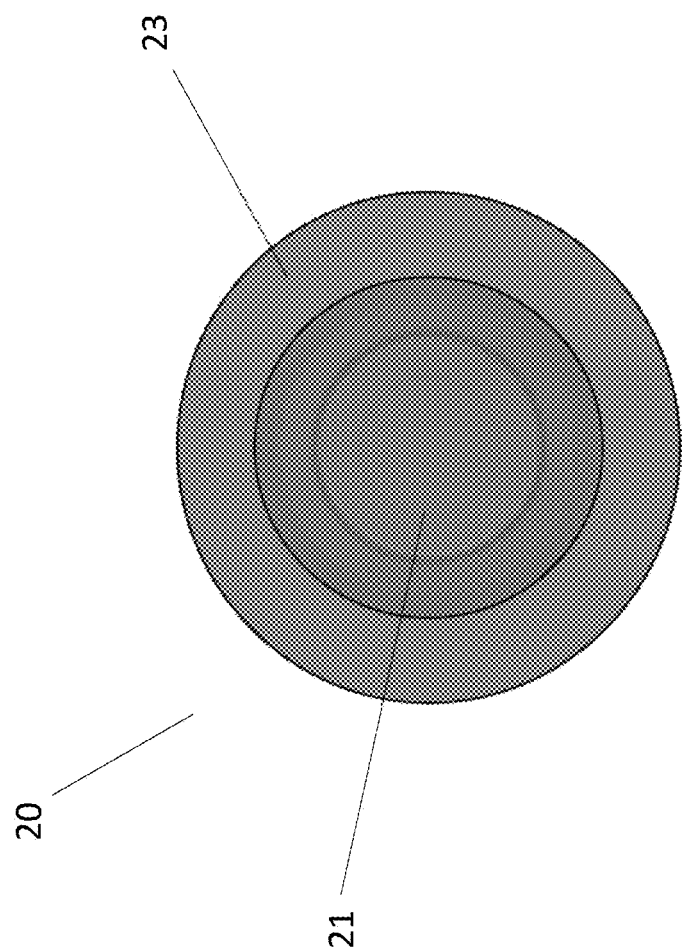
FIG. 2 is a cutaway schematic depicting a multifunctional CSN, according to aspects of the present disclosure.

According to some aspects, the catalytic core component may be encompassed by one or more outer shells. As shown in FIG. 2, the CSN 20 may comprise an outer shell 23 encompassing the catalytic core component 21, which may be any of the catalytic core components as described herein.

Figure 3:
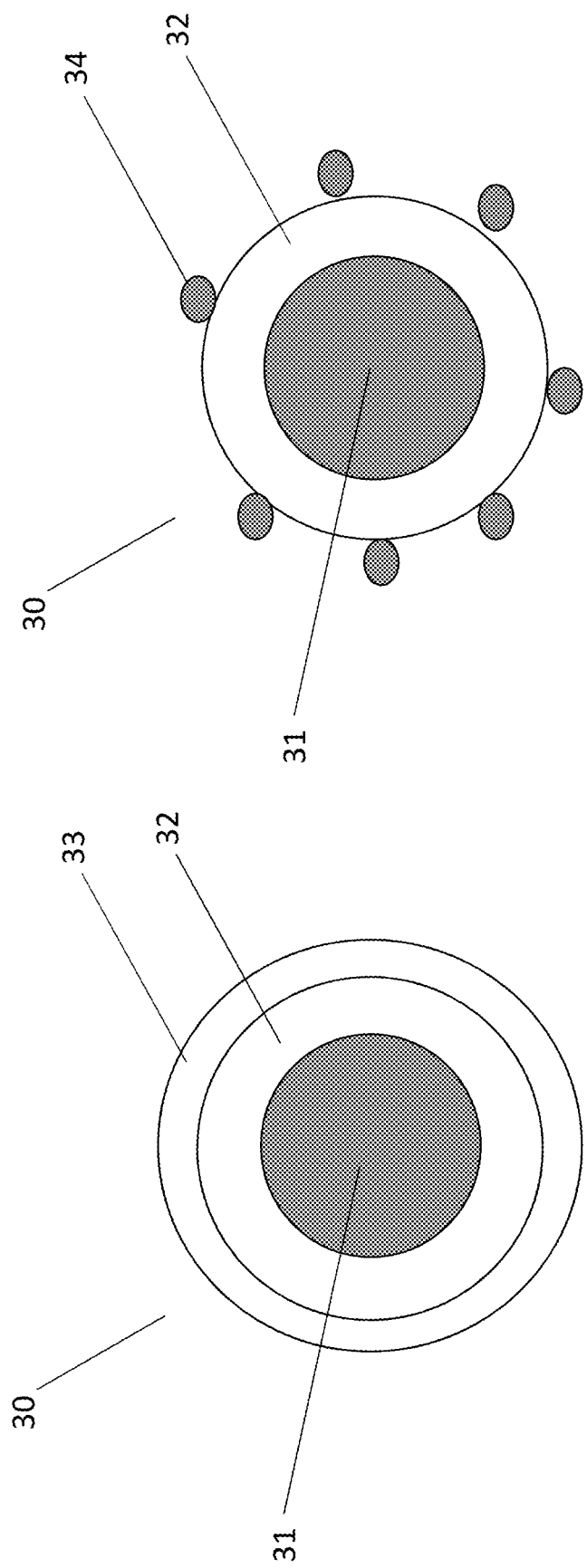
FIG. 3a is a cutaway schematic depicting a multifunctional CSN with a shell completely covering the catalytic core component, according to aspects of the present disclosure.
FIG. 3b is a cutaway schematic depicting a multifunctional CSN with a shell partially covering the catalytic core component, according to aspects of the present disclosure.

The outer shell may provide complete coverage of the CSN (i.e., cover 100% of the catalytic core component's surface area). For example, as shown in FIG. 3a, the CSN 30 may comprise a solid catalytic core component having a first catalytic material 31 with a second catalytic material coating 32, and a shell 33 covering the entire surface area of the catalytic core component.

Alternatively, the outer shell may provide partial coverage of the CSN (i.e., cover less than 100% of the catalytic core component's surface area). For example, as shown in FIG. 3b, the CSN 30 may comprise a solid catalytic core component having a first catalytic material 31 with a second catalytic material coating 32, and a shell 34 covering a portion of the catalytic core component, the portion covered referred to herein as percent shell coverage.

The outer shell may cover at least 90% of the catalytic core component's surface area (that is, the CSN may have at least 90% shell coverage), at least 80% of the catalytic core component's surface area, at least 70% of the catalytic core component's surface area, at least 60% of the catalytic core component's surface area, at least 50% of the catalytic core component's surface area, at least 40% of the catalytic core component's surface area, at least 30% of the catalytic core component's surface area, at least 20% of the catalytic core component's surface area, or at least 10% of the catalytic core component's surface area.

According to some aspects, percent shell coverage may be selected in order to provide optimal performance. As used herein, the term "optimal performance" refers to performance at or near a CSN's capacity for a selected performance parameter. For example, according to some aspects, percent shell coverage may be selected to provide optimal current density. Additionally or alternatively, percent shell coverage may be selected to provide optimal catalytic activity, for example, optimal $CO_2$ adsorbance and/or selective conversion of $CO_2$ to certain gas and/or alcohol products (including, but not limited to, ethanol, n-propanol, and combinations thereof). It should be understood that the percent shell coverage required to provide optimal performance may vary based on certain characteristics of the CSN, for example, the nature of the catalytic core component and/or the shell.

According to some aspects, percent shell coverage for a CSN comprising an $LaF_3$ shell may be from about 25 to 45%, optionally from about 30 to 40%, optionally from about 31 to 37%, optionally from about 32 to 36%, optionally from about 33 to 36%, and optionally about 34%.

According to some aspects, percent shell coverage for a CSN comprising an $La(OH)_3$ shell may be from about 1 to 20%, optionally from about 5 to 15%, optionally from about 6 to 14%, optionally from about 6 to 13%, optionally from about 8 to 12%, optionally from about 9 to 11%, and optionally about 10%.

According to some aspects, percent shell coverage may correspond to one more steps in the CSN synthesis process. For example, according to some aspects, percent shell coverage may correspond, at least in part, to the amount and/or concentration of starting material used to provide the shell.

For example, in CSNs comprising an $LaF_3$ shell, percent shell coverage may correspond, at least in part, to the concentration of $La(NO_3)_3 \cdot 6H_2O$ and/or NaF used to provide the $LaF_3$ shell. In one non-limiting example, about 1 mmol of $La(NO_3)_3 \cdot 6H_2O$ and 1 mmol of NaF may provide about 18% shell coverage. In another non-limiting example, about 2 mmol of $La(NO_3)_3 \cdot 6H_2O$ and 2 mmol of NaF may provide about 34% shell coverage. In another non-limiting example, about 4 mmol of $La(NO_3)_3 \cdot 6H_2O$ and 4 mmol of NaF may provide about 50% shell coverage.

In another example, in CSNs comprising an $La(OH)_3$ shell, percent shell coverage may correspond, at least in part, to the concentration of $La(NO_3)_3 \cdot 6H_2O$ and/or hydrazine hydrate used to provide the $La(OH)_3$ shell. In one non-limiting example, about 0.1 mmol of $La(NO_3)_3 \cdot 6H_2O$ and about 1.5 mL of hydrazine in water (the volume of water being adjusted to equal 30 mL total) may provide about 10% shell coverage. In another non-limiting example, about 1 mmol of $La(NO_3)_3 \cdot 6H_2O$ and about 2 mL of hydrazine in water (the volume of water being adjusted to equal 30 mL total) may provide about 24% shell coverage. In another non-limiting example, about 2 mmol of $La(NO_3)_3 \cdot 6H_2O$ and about 3 mL of hydrazine in water (the volume of water being adjusted to equal 30 mL total) may provide about 47% shell coverage.

It should be understood that one or more of the percent shell coverages values described herein may correspond to an estimation. According to some aspects, the estimation may be obtaining using a model, wherein the model is based, at least in part, on the shape, size, and/or thickness of the CSN and/or components thereof. For example, percent shell coverage may be determined by estimating full shell coverage (i.e., 100% shell coverage) using a model and then comparing the estimated full shell coverage with the amount of shell material (or portions thereof) comprised by the CSN, wherein the amount of shell material (or portions thereof) is determined using one or more measuring devices and/or techniques known in the art, such as an Inductively Coupled Plasma (ICP) technique and/or an Energy-Dispersive X-ray Spectroscopy (EDS) technique.

The outer shell may comprise a shell material with certain desirable characteristics, particularly when used in electrochemical cells that electrochemically convert carbon dioxide to fuels, polymers, and/or other products. One desirable characteristic of the shell material may be its interaction with carbon dioxide and/or carbonate ions. For example, the shell material may interact with carbon such that carbon dioxide and/or carbonate ions are absorbed and/or chemisorbed onto the CSN surface via a strong chemical bond. This interaction may also provide a single monolayer type of carbon dioxide and/or carbonate ions on the CSN surface. For example, a nanoparticle catalyst without the shell material may exhibit a series of binding modes with carbon dioxide and/or carbonate ions (e.g., bending, linear, oxygen binding, and/or carbon binding to catalytic surfaces), whereas CSNs according to the present disclosure may exhibit a single binding mode. This characteristic, at least in part, may increase the local concentration of carbon dioxide and/or carbonate ions on the surface of the CSN and/or the amount of time carbon dioxide and/or carbonate ions are adsorbed and/or chemisorbed on the surface of the CSN (and thus, the concentration of carbon dioxide and/or carbonate ions available to be catalyzed by the catalytic core component) when compared to nanoparticles without the shell material. This characteristic may also aid in increasing reaction product specificity. The shell material may thus, for example, help overcome problems associated with poor solubility of carbon dioxide in aqueous electrolytes, and enhance the catalytic activity of and the specificity of the reaction product produced by this type of electrochemical cell.

Another desirable characteristic of the shell material may be that it modifies the pH of the surface of the CSN. For example, the shell material may modify the basicity of the CSN surface. Such a pH modification may, for example, affect adsorption and/or chemisorption of carbon dioxide and/or carbonate ions on the surface of the CSN (and thus, the concentration of carbon dioxide/carbonate ions available to be catalyzed by the catalytic core component).

Another desirable characteristic of the shell material may be that it lowers the binding energy of reaction intermediates to the CSN. For example, a reaction catalyzed by a catalyst with a high binding energy of reaction intermediates generally requires more energy than a reaction catalyzed by a catalyst with a lower binding energy. By lowering the binding energy of reaction intermediates, the shell material may thus improve the catalytic activity of the catalytic core component by reducing the amount of energy required by a reaction.

Another desirable characteristic of the shell material may be its effect on electron turnover. For example, the shell material may comprise a component that facilitates fast electron turnover, which may increase the rate of conversion of carbon dioxide by the catalytic core component compared to catalyst nanoparticles without the shell material.

The shell material may possess some or all of the above characteristics.

The shell material may comprise a halogen. The halogen may, for example, be capable of forming a strong chemical bond with carbon. According to some aspects, the halogen may be comprised by an anion of a halide and/or a ternary compound. For example, the shell material may comprise a fluoride and/or an oxyfluoride.

The shell material may comprise oxygen. According to some aspects, the oxygen atom may be comprised by an anion, for example, an anion of an oxide, hydroxide, and/or an oxyfluoride The shell material may also comprise a metal. The metal, for example, may be capable of providing a redox couple that facilitates fast electron turnover during the reduction of carbon dioxide. According to some aspects, the metal may be comprised by the cation of a halide, oxide, hydroxide, and/or ternary compound. Examples of metals useful in the shell material include, but are not limited to, lanthanum, calcium, cerium, magnesium, and manganese.

The shell material may comprise an organic molecule. As used herein, the term "organic molecule" refers to a molecule comprising one or more carbon atoms in rings and/or chains along with one or more other atoms (e.g. hydrogen, oxygen, and nitrogen) bound thereto.

Examples of shell materials useful according to the present disclosure include, but are not limited to, $LaF_3$, $La(OH)_3$, $CeF_3$, $CaF_2$, $MgF_2$, $MeF_3$, LaOF, CeOF, $La_2O_3$, $CeO_2$, organic molecules (including, for example, organic molecules containing one or more amine ($NH_2$) groups), and combinations thereof.

Figure 4:
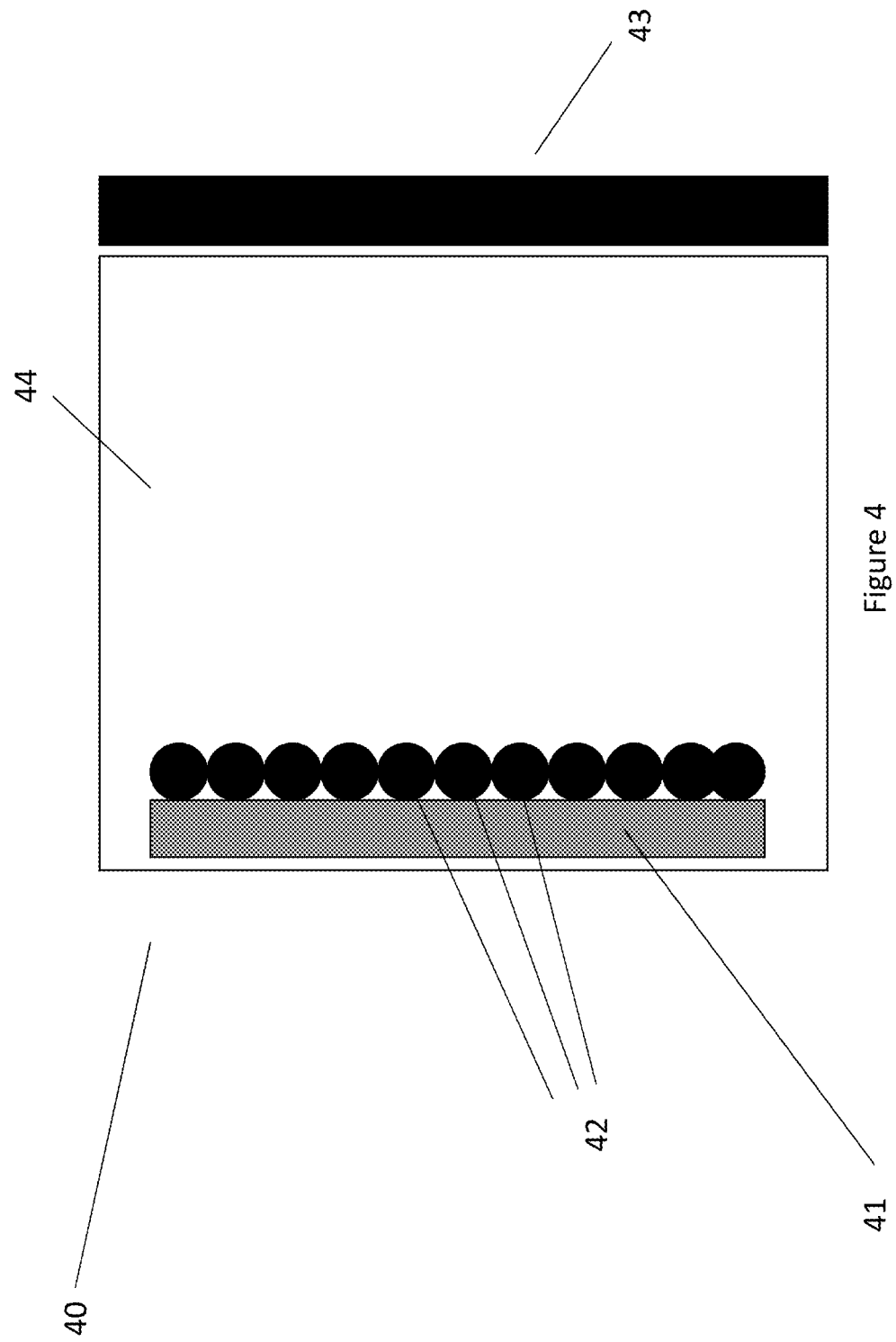
FIG. 4 is a cutaway schematic depicting an electrochemical cell, according to aspects of the present disclosure.

Aspects of the present disclosure are also related generally to electrochemical cells and electrochemical cell electrodes comprising the multifunctional CSNs described herein. In particular, as shown in FIG. 4, the electrochemical cells 40 of the present disclosure may comprise at least a cathode 41 comprising multifunctional CSNs 42, an anode 43, and a liquid electrolyte 44, and may convert carbon dioxide to useful products (e.g., fuels, polymers, etc.) when the cell is energized. For example, the electrochemical cell may reduce carbon dioxide to carbon monoxide, a C2-C3 alkane, a C2-C3 alkene, a C2-C3 alcohol, a C2-C3 carboxylic acid, a C2-C3 aldehyde, or a combination thereof. According to some aspects, the electrochemical cell is energized without creating any additional carbon dioxide.

The electrochemical cell may comprise an electrode (e.g., a cathode) that includes an electrocatalyst, specifically an electrocatalyst comprising the CSNs as described herein. The electrodes of the present disclosure exhibit certain distinguishing properties over previously known electrodes. For example, electrodes according to the present disclosure may exhibit higher catalytic activity, stability, and selectivity compared with other electrodes known in the art. These distinguishing properties may, at least in part, result from the combination of the catalytic core component and one or more outer shells of the CSNs.

For example, the electrodes of aspects of the present disclosure may exhibit a higher stability than known electrodes, due, at least in part, to the outer shell of the CSNs. For example, the outer shell may protect the catalytic core component from corrosion by an electrolyte solution and/or suppress hydrogen evolution reactions. The outer shell may also reduce or inhibit carbon deposition and/or metal deposition from impurities in the electrolyte, which can reduce catalytic performance over time. The electrodes of the present disclosure may also exhibit a higher catalytic activity and/or selectivity due, at least in part, to the desirable characteristics of the shell material, as described herein.

According to some aspects and as discussed above, certain properties of the CSNs may result from, for example, the amount of coverage of the outer shell over the catalytic core component, that is, the percent shell coverage.

For example, if the outer shell covers 100% of the surface area of the catalytic core component, the CSN may exhibit high stability (i.e., maximized protection of the catalytic material from deactivation or poisoning), high chemisorption/adsorption due to maximized chemisorption/adsorption sites, and a large amount of redox reaction sites. If the outer shell partially covers the surface area of the catalytic core component, there may be more catalytic active sties exposed compared to complete coverage (and thus, more catalytic active sties able to catalyze the reduction of carbon dioxide).

Aspects of the present disclosure are also directed to methods of making the components described herein, and methods of electrochemically converting carbon dioxide into useful products using the CSNs, electrodes, and/or electrochemical cells described herein.

For example, a method for making the CSNs may include mixing catalytic material nanoparticles, a reducing agent, a metal salt, and a fluoride salt to form coated metal nanoparticles comprising a metal halide or metal oxyhalide shell around a core comprising the catalytic material nanoparticles.

The catalytic material may comprise one or metals. The metals used to form the core may be synthesized by mixing a metal precursor solution with a reducing agent to form metal nanoparticles.

In some embodiments, the metal nanoparticles used to form the core may be synthesized in the presence of a stabilizer that prevents or otherwise inhibits oxidation of the metal nanoparticles during synthesis, and is readily removable from the metal nanoparticles prior to formation of the metal halide or metal oxyhalide shell thereon. For example, bulky polymers such as polyvinylpyrrolidone (molecular weight of 55,000 g/mol) used during metal nanoparticle synthesis inhibit oxidation of metal nanoparticles. However, such stabilizers are not readily removable from the metal nanoparticles following synthesis. Without being limited to any particular theory, residual stabilizer can form an additional layer between the core formed by the metal nanoparticles and the metal halide or oxyhalide shell that detracts from the performance of the CSN in the desired system.

Therefore, a stabilizer may be used in the synthesis of the metal nanoparticles used to form the core that is readily removable therefrom to minimize the amount of stabilizer on the surface of the core prior to formation of the metal halide or metal oxyhalide shell directly thereon. In a non-limiting example, the one or more stabilizers may be used in the synthesis of the metal nanoparticles includes a molecular weight (either individually or a weight average) of less than 1000 g/mol, optionally less than 500 g/mol, optionally less than 375 g/mol, and optionally less than 350 g/mol. Illustrative examples include hexadecyltrimethylammonium bromide (CTAB) with a molecular weight of 364 g/mol, citric acid with a molecular weight of 192 g/mol, and mixtures thereof.

The shell of the CSNs may be formed by mixing isolated metal nanoparticles used to form the core with, for example, a metal salt solution and a halide salt solution that react to deposit the metal halide shell directly on the core. The shell may entirely surround the core or it may only partially cover the core. In some embodiments, the metal salt used to form the shell is selected from the group consisting of alkali metal salts, alkaline earth metal salts, and transition metal salts. In certain embodiments, the metal salt used to form the shell is a transition metal salt. In certain embodiments, the metal salt used to form the shell is selected from the group consisting of lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride.

In other embodiments, the present disclosure is directed to an electrode comprising the CSNs disclosed herein. All aspects and embodiments described with respect to the CSNs and methods of making thereof apply with equal force to the electrode. In a non-limiting example, the electrode is a cathode in an electrochemical cell for the conversion of carbon dioxide to an organic feedstock. An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

A "reducing agent" is a substance that causes the reduction of another substance, while it itself is oxidized. Reduction refers to a gain of electron(s) by a chemical species, and oxidation refers to a loss of electron(s) by a chemical species.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "fluoride salt" is an ionic complex in which the anion(s) is(are) fluoride ion(s). According to the present disclosure, the cation of the fluoride salt may be any positively charged chemical species.

A "metal fluoride" is an ionic complex in which the cation is a metal ion and the anion(s) is(are) fluoride ion(s). According to the present disclosure, the metal salt and the fluoride salt react to create a metal fluoride shell around the metal nanoparticle core.

The term "electrochemical cell" refers to devices and/or device components that facilitate chemical reactions through the introduction of electrical energy. Electrochemical cells have two or more electrodes (e.g., positive and negative electrodes) and an electrolyte.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

I. CSN Comprising a Metal Core and a Metal Halide or Metal Oxyhalide Shell

In an embodiment, a CSN is provided that comprises a metal core that is at least partially surrounded by a metal halide or a metal oxyhalide shell.

In an illustrative example, a halide shell is provided that is tailored to protect the metal core nanoparticle from the environment of the electrode while maintaining the desired performance of the metal nanoparticle. In a non-limiting example, the core may comprise copper metal and the shell may comprise $LaF_3$.

A method of making the CSN may comprise providing a first mixture comprising a metal nanoparticle and a reducing agent, and mixing the first mixture with a solution comprising a metal salt and a halide salt to form a metal halide or metal oxyhalide shell on the metal nanoparticles.

I(a). Synthesis and Isolation of the Metal Core

In general, metal nanoparticles for use as the metal core may be synthesized by reacting a metal salt solution with a reducing agent in the presence of one or more stabilizers. In an illustrative example, the metal salt solution comprises a copper (II) nitrate hemipentahydrate $(Cu(NO_3)_2.2.5H_2O)$ as the metal salt. The metal salt is mixed with CTAB and water, and the pH of the mixture may be adjusted to a pH of about 10-11, with for example, ammonium or sodium hydroxide.

Prior to addition of the reducing agent to the metal salt solution, the reducing agent may be mixed with one or more stabilizers and water, and mixed for a period of time, such as twenty minutes, prior to combining with the metal salt solution. The reducing agent is selected from the group consisting of hydrazine, sodium borohydride, sodium cyanoborohydride, sodium dithionate, sodium dithionite, iron (II) sulfate, tin (II) chloride, potassium iodide, oxalic acid, formic acid, ascorbic acid, thiosulfate salts, dithionate salts, phosphorous acid, phosphite salts, and hypophosphite salts. In a preferred embodiment, the reducing agent is hydrazine.

The metal salt solution and the reducing agent are combined to form the metal nanoparticles. Synthesis of the metal nanoparticles is performed in an atmosphere free of oxygen. Illustrative examples of atmospheres free of oxygen include, but are not limited to, nitrogen, argon, helium, hydrogen, and mixtures thereof. Following synthesis, the metal nanoparticles are isolated from the synthesis solution. It is to be understood that the method of isolating the metal nanoparticles is not limited, and may include one or more techniques such as filtering, decanting, and centrifuging. The metal nanoparticles may be washed one or more times with a solvent, such as ethanol, to remove any residual stabilizer or other organic material from the surface thereof.

I(b) Shell Formation

In general, the isolated metal nanoparticles may be redispersed in an aqueous solution containing additional reducing agent under an atmosphere that is free of oxygen. The mixture containing the isolated metal nanoparticles and reducing agent is then mixed under an atmosphere free of oxygen with a metal salt solution and a halide salt solution used to form the metal halide shell on the metal nanoparticle core. The metal salt solution and the fluoride salt solution used to form the shell may be added sequentially to the nanoparticle mixture, or the metal salt solution and the fluoride salt solution used to form the shell may be added simultaneously to the nanoparticle mixture.

I (c) Comparative Example 1 and Experimental Example 1

Figure 5:
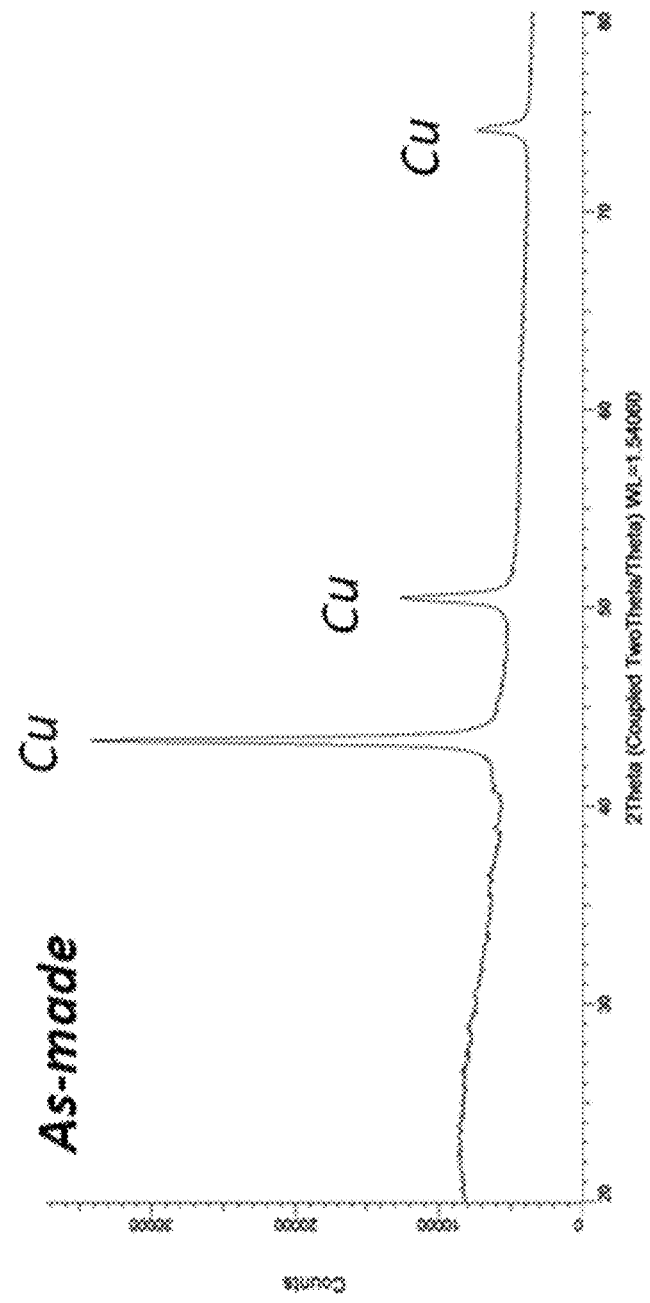
FIG. 5 shows an XRD spectrum of isolated copper nanoparticles of Comparative Example 1, with no shell, immediately after synthesis and isolation ("as-made").
Figure 6:
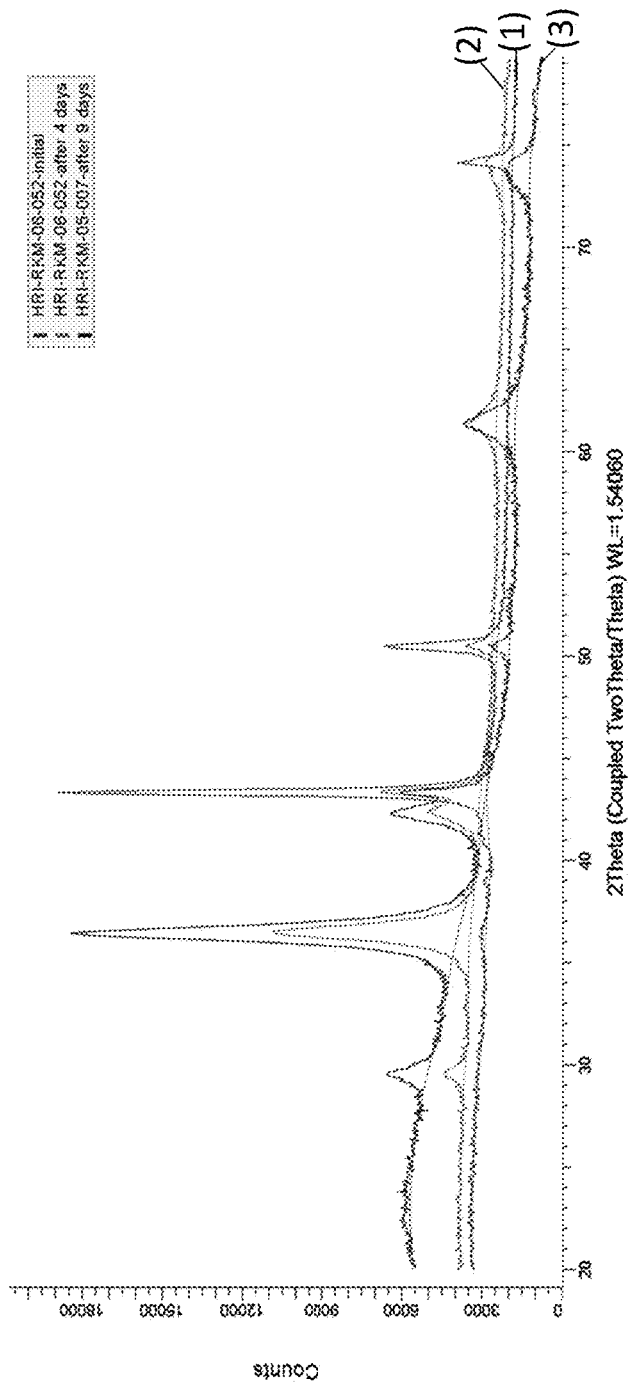
FIG. 6 shows stacked XRD spectra of isolated copper nanoparticles of Comparative Example 1, with no shell, as-made and after exposure to air for 4 days and 9 days.

In a Comparative Example 1, copper nanoparticles were made without a shell and analyzed. First, 2 mmol of $Cu(NO_3)_2 \cdot 2.5H_2O$ and 1.87 mmol CTAB were dissolved in 75 ml water at room temperature, and 0.5 ml $NH_4OH$ (28-30 wt % $NH_3$ in water, 14.8M) were added to adjust the pH to about 10-11. A solution was prepared containing hydrazine (3 ml of 50-60% reagent grade), CTAB (1.87 mmol), and citric acid (0.38 mmol) in water (75 ml) under argon and mixed for about 20 minutes before adding the copper nitrate solution. The reaction mixture was stirred for 1.5 hrs, to maximize copper nanoparticle growth. The resulting copper nanoparticles (~50 nm) were isolated and washed. Specifically, the reaction synthesis mixture was centrifuged, decanted, mixed with ethanol and sonicated. FIG. 5 shows an X-ray diffraction (XRD) spectrum of the copper nanoparticles as-made. Three peaks are visible, all corresponding to Cu (°2θ): 43.0, 50.5, and 74.0. However, upon exposure to air, Cu is oxidized to $Cu_2O$, which begins forming at least as early as 4 days and is the main product after 9 days. This is illustrated in FIG. 6, which shows appearance of new peaks at 29.5, 42.3, 61.3, and 73.5°2θ, corresponding to $Cu_2O$.

In Experimental Example 1, CSNs were made in accordance with the present disclosure that comprised a core comprising a copper nanoparticle coated with a shell comprising lanthanum fluoride ($Cu/LaF_3$). The ~50 nm copper nanoparticles were made using the same method as Comparative Example 1, but were redispersed in water with 3 ml of hydrazine (3 ml of 50-60% reagent grade) under an argon atmosphere following isolation and washing of the copper nanoparticles. To the mixture of water, copper nanoparticles, and hydrazine was added a solution of $La(NO_3)_3 \cdot 6H_2O$ (1 mmol in 15 ml $H_2O$) and a solution of NaF (1 mmol in 15 ml $H_2O$). The reaction mixture was stirred for 10 minutes and then centrifuged.

Figure 7:
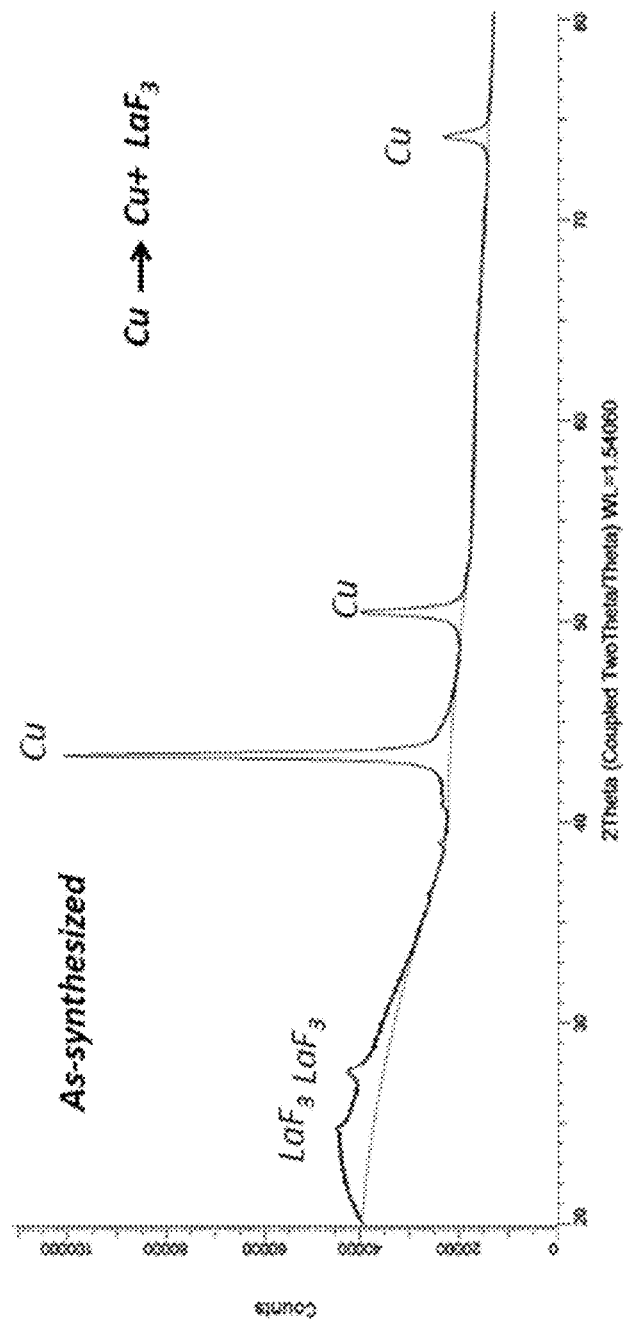
FIG. 7 shows an XRD spectrum of Cu—LaF3 CSNs of Experimental Example 1 as synthesized in an aspect of the present disclosure.
Figure 8:
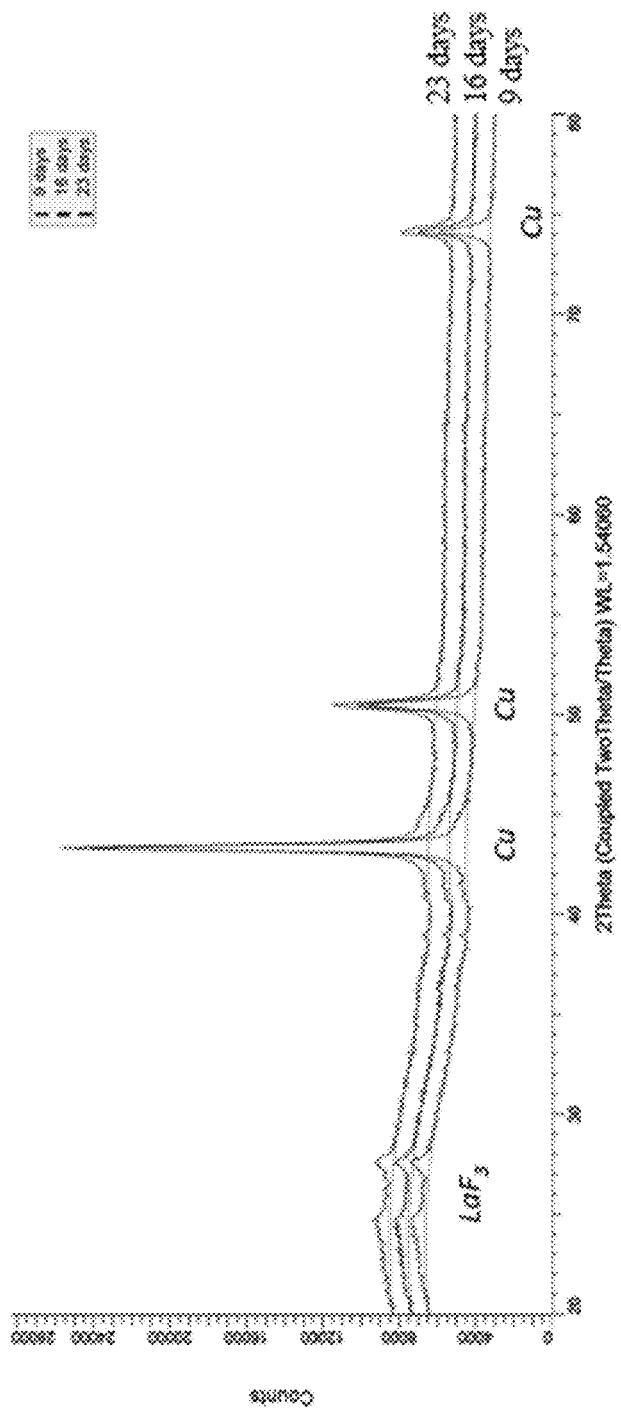
FIG. 8 shows stacked XRD spectra of Cu—LaF3 CSNs of Experimental Example 1 after exposure to air for 9, 16, and 23 days.
Figure 10A:
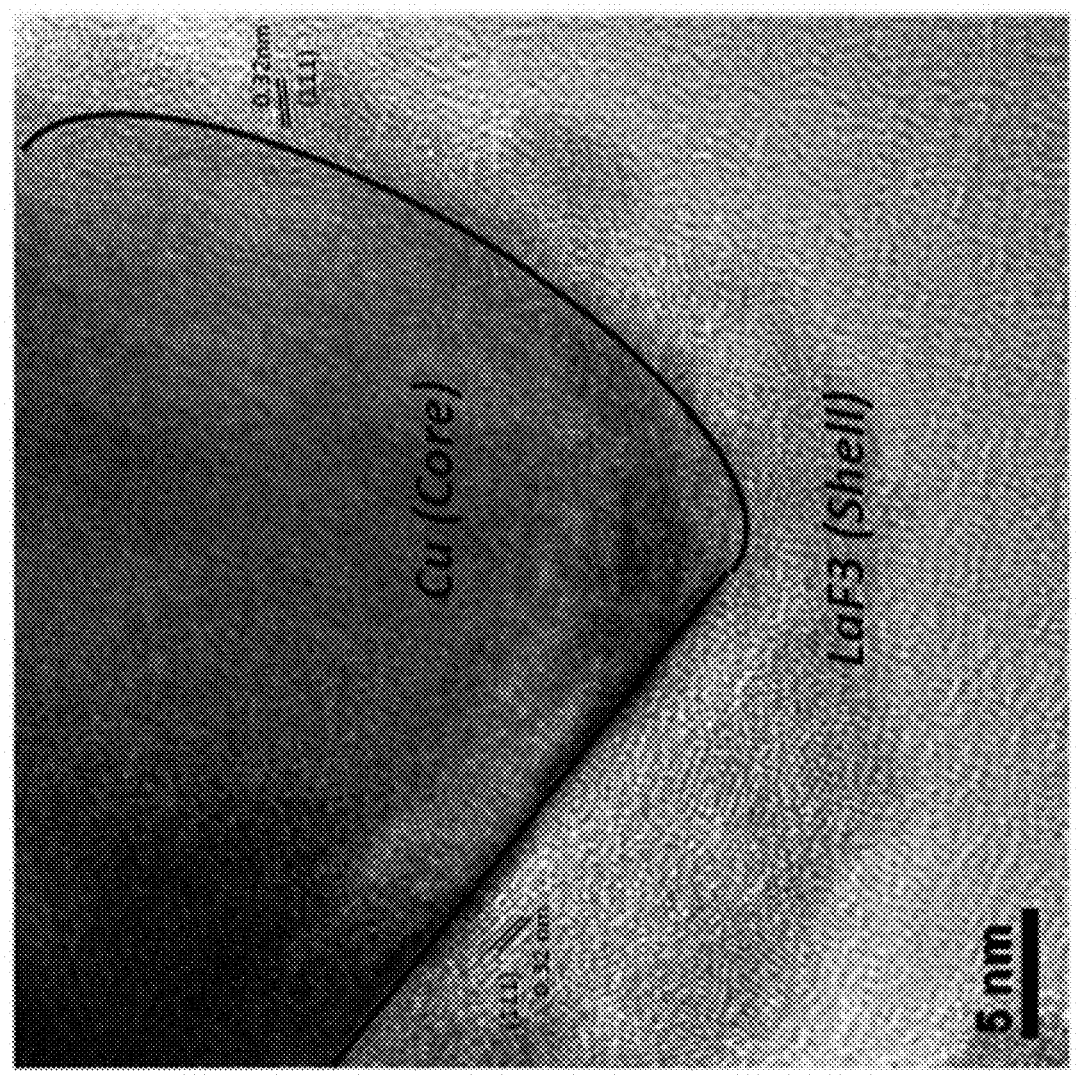
FIG. 10A shows a high-resolution TEM image of Cu—LaF3 CSNs of Experimental Example 1, indicating the Cu (core) and LaF3 (shell) areas.
Figure 10C:
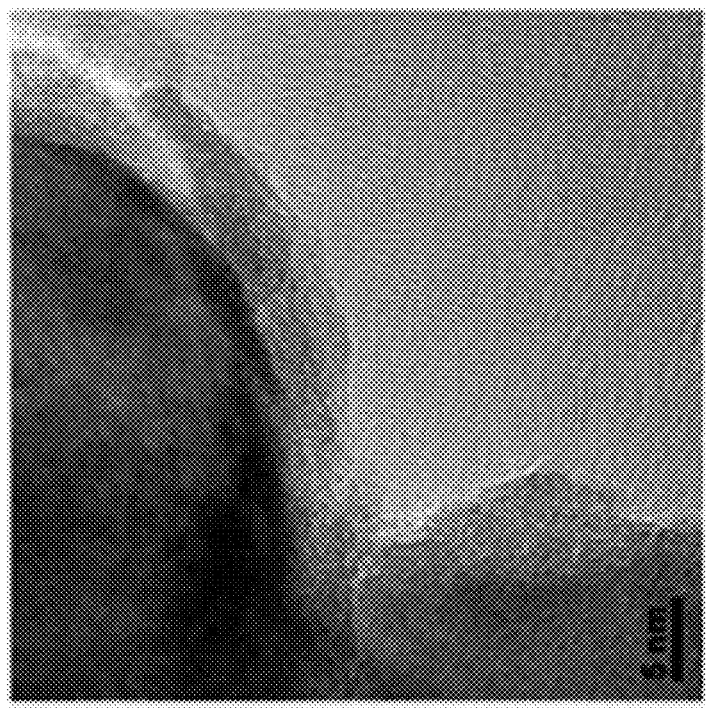
FIGS. 10B and 10C show zoomed-out images of the same nanoparticles.
Figure 10B:
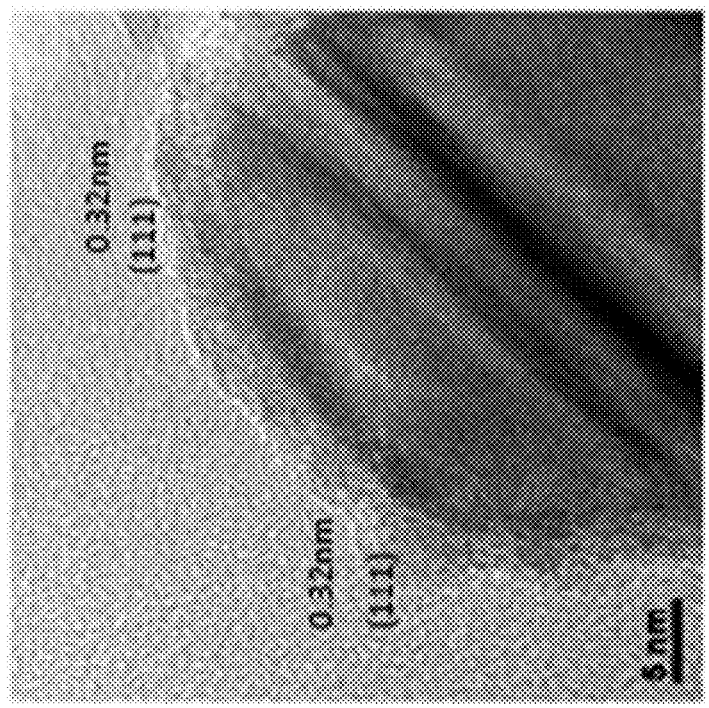

The precipitate was isolated by centrifuge and analyzed by XRD. The XRD spectrum of the CSNs as synthesized in is shown in FIG. 7. The XRD spectrum shows 5 peaks (° 2θ): 25.0 ($LaF_3$), 28.0 ($LaF_3$), 43.5 (Cu), 50.4 (Cu), 74.0 (Cu). FIG. 8 shows stacked XRD spectra of the CSNs upon exposure to air for 9, 16, and 23 days. In contrast to Comparative Example 1, no spectral changes were observed. FIGS. 9A and 9B show TEM images of the CSNs as synthesized. As shown, the copper nanoparticle cores are covered with the $LaF_3$ shell. The shell has a thickness of about 0.30 nanometers. FIGS. 10A-10C show high-resolution TEM images of the CSNs as synthesized. The central black areas correspond to the copper core, and the peripheral black and white areas correspond to the $LaF_3$ shell. The figures show homogeneous coverage of the copper core with the $LaF_3$ shell.

Accordingly, the CSN synthesized in Experimental Example 1 provides a shell capable of protecting the underlying metal core. Such a CSN is useful for applications where the operating conditions would dissolve, oxidize, or otherwise contaminate the metal core. Illustrative examples include use of the CSNs as catalysts for use with a cathode of an electrochemical cell for the conversion of $CO_2$ to an organic feedstock.

II. CSN Comprising a Modified Metal Core and a Metal Halide or Metal Oxyhalide Shell Covering the Modified Core In some applications, it may be desirable for the core to include a metal oxide. In an embodiment, a CSN is provided that includes a core comprising a metal nanoparticle coated with an oxide of the metal nanoparticle, and a shell comprising a metal halide or a metal oxyhalide that at least partially surrounds the metal oxide layer of the metal core.

In an illustrative example, the CSN may be included in an electrode of an electrochemical cell for the conversion of carbon dioxide to an organic feedstock. Without being limited to any particular theory, formation of the metal oxide layer on the outer surface of the metal core can improve the selectivity and catalytic activity of the core-shell catalyst in the electrochemical cell. Formation of the metal oxide layer and the state of the oxide may be controlled during synthesis of the nanoparticle core and/or the shell to produce the desired catalysts properties.

A method of making the CSN may comprise forming a metal oxide layer on a metal nanoparticle and coating the metal oxide layer with a metal halide or a metal oxyhalide shell formed from a solution comprising a metal salt and a solution comprising a halide salt. The metal oxide layer may be formed before or during formation of the halide or oxyhalide shell.

II(a) Synthesis and Isolation of the Metal Nanoparticles for Forming the Core

Metal nanoparticles for forming the core of the shell-core particle may be prepared and isolated in the same manner as described in I(a).

II(b) Shell Formation

The isolated metal nanoparticles are redispersed in an aqueous solution under an atmosphere free of oxygen.

Unlike I(a), the aqueous solution is free of a reducing agent. The mixture containing the isolated metal nanoparticles is then mixed under an atmosphere free of oxygen with a metal salt and a halide salt to form the metal halide shell on the nanoparticle core. It is to be understood that the metal oxide layer formed on the metal nanoparticle may be formed prior to, or during, synthesis of the shell thereon to produce the CSN including a core comprising a metal particle coated with a layer of metal oxide, and a shell coating the metal oxide layer of the core.

In some embodiments, the metal salt is selected from the group consisting of alkali metal salts, alkaline earth metal salts, and transition metal salts. In certain embodiments, the metal salt is selected from the group consisting of lanthanum salts, cerium salts, and magnesium salts.

Illustrative metals for the core include, but are not limited to, iron, cobalt, nickel, copper, and lead. In a non-limiting example, the core is comprised of copper metal coated with a copper oxide ($CuO_x$). In a non-limiting example, the $CuO_x$ is $CuO_2$. Illustrative compounds for the shell include $CeF_3$, CeOF, $LaF_3$, and LaOF.

II (c) Experimental Example 2

A CSN was synthesized that included a core comprising a copper nanoparticle coated with a layer of copper oxide, and a shell comprising lanthanum fluoride covering the copper oxide layer ($Cu/CuO_x/LaF_3$). Experimental Example 2 was performed identically to Experimental Example 1, except that the ~50 nm copper nanoparticles were redispersed in water without a reducing agent, and under an argon atmosphere. Without the reducing agent present during the shell formation step, the outer surface of the copper nanoparticles was converted to a layer of copper oxide upon which the shell was formed similar to what is shown in FIG. 3B.

Figure 11:
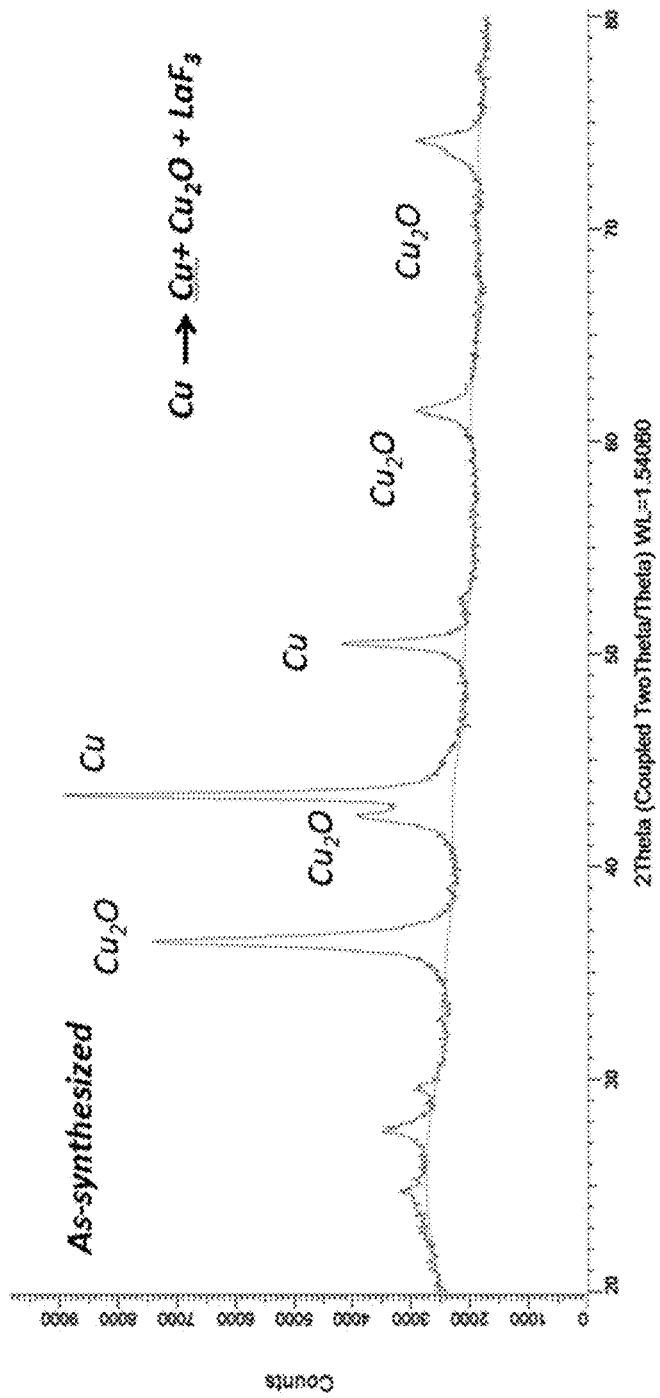
FIG. 11 shows an XRD spectrum of Cu—Cu2O—LaF3 CSNs of Experimental Example 2 as synthesized in an aspect of the present disclosure.

As shown in FIG. 11, the XRD spectrum of the CSNs as synthesized in Experimental Example 2 showed 6 peaks (° 2θ): 36.5 ($Cu_2O$), 42.3 ($Cu_2O$), 43.5 (Cu), 50.4 (Cu), 61.5 ($Cu_2O$), 74.0 ($Cu_2O$).

The resulting core-shell particle including a core comprising a Cu nanoparticle coated with a $Cu_2O$ layer and a shell comprising $LaF_3$ coating the $Cu_2O$ layer is useful as a catalyst, and may be included as part of the cathode of an electrochemical cell for the conversion of carbon dioxide to an organic feedstock. The $LaF_3$ shell is capable of protecting the active catalyst sites of the core, while increasing the local concentration of $CO_2$ available for conversion.

III. CSN Comprising a Modified Metal Core and a Metal Halide or Metal Oxyhalide Shell In an embodiment, a CSN is provided that includes a core comprising a metal oxide nanoparticle and a shell that at least partially coats the core. The shell comprises a metal halide or a metal oxyhalide shell.

In an illustrative example, the CSN may be included in an electrode of an electrochemical cell for the conversion of carbon dioxide to an organic feedstock. Without being limited to any particular theory, formation of the metal oxide can improve the selectivity and catalytic activity of the core-shell catalyst in the electrochemical cell. Formation of the metal oxide can be controlled during synthesis of the nanoparticle core and/or the shell to produce the desired catalyst properties.

The CSN may be formed by converting the metal nanoparticles to metal oxide nanoparticles, and forming the shell on the metal oxide particles by mixing in a solution comprising a metal salt and a solution comprising a halide salt. The metal nanoparticles may be converted to the oxide before and/or after mixing with the metal salt and the halide salt that forms the shell thereon.

III(a) Synthesis and Isolation of the Modified Metal Core

The metal nanoparticles used to form the core of the shell-core particle may be prepared and isolated in the same manner as described in I(a) and II(a). The isolated metal nanoparticles are then modified to convert the metal nanoparticles to metal oxide nanoparticles. In a non-limiting example, the metal nanoparticles may be at least partially converted to metal oxide nanoparticles by redispersing the metal nanoparticles in an aqueous solution free of a reducing agent and exposing the mixture to an atmosphere containing oxygen.

III(b) Shell Formation

In addition to, or alternatively, the isolated metal nanoparticles may be converted to metal oxide nanoparticles by exposing the metal nanoparticles to an atmosphere containing oxygen during formation of the metal halide or metal oxyhalide shell. For example, the isolated metal nanoparticles may be mixed with the solution comprising the metal salt and the solution comprising the halide salt under an atmosphere containing oxygen to convert the metal nanoparticles to metal oxide nanoparticles and form the metal halide or metal oxyhalide shell on the metal oxide nanoparticle core. It is to be understood that the oxide core of the core-shell structure may be a single particle, or it may be an agglomeration of smaller metal oxide nanoparticles. It is also to be understood that the metal oxide core may be hollow as shown in FIG. 1C.

Illustrative metals for the core include, but are not limited to, iron, cobalt, nickel, copper, and lead. In a non-limiting example, the core is comprised of a copper oxide (CuOx). In a non-limiting example, the $CuO_x$ is $CuO_2$. Illustrative compounds for the shell include $CeF_3$, CeOF, $LaF_3$, and LaOF.

III(c) Experimental Example 3

A CSN comprising a copper oxide nanoparticle core and a lanthanum fluoride shell was synthesized. First, 2 mmol of $Cu(NO_3)_2.2.5H_2O$ and 1.87 mmol CTAB were dissolved in 75 ml water at room temperature, and 0.5 ml $NH_4OH$ (28-30 wt % $NH_3$ in water, 14.8M) were added to adjust the pH to about 10-11. The copper nitrate solution was poured into a solution containing hydrazine (3 ml of 50-60% reagent grade), CTAB (1.87 mmol), and citric acid (0.38 mmol) in water (75 ml) under argon. The reaction mixture was stirred for 1.5 hrs, to maximize copper nanoparticle growth. The resulting copper nanoparticles (~50 nm) were isolated and washed. Specifically, the reaction synthesis mixture was centrifuged, decanted, mixed with ethanol and sonicated. These steps were repeated two more times and the copper nanoparticles were redispersed in 150 ml of water under open air.

Figure 12:
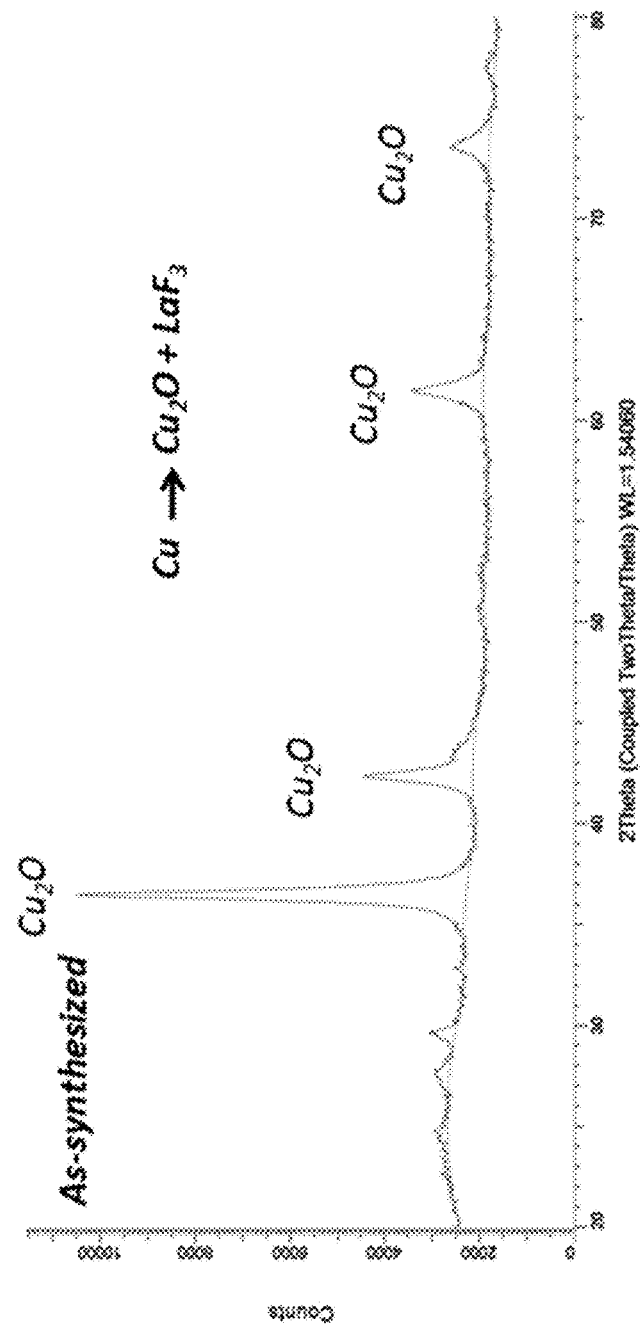
FIG. 12 shows an XRD spectrum of Cu2O—LaF3 CSNs of Experimental Example 3 as synthesized in an aspect of the present disclosure.

To the mixture of water and copper nanoparticles was added $La(NO_3)_3.6H_2O$ (1 mmol in 15 ml $H_2O$) and NaF (1 mmol in 15 ml $H_2O$. The reaction mixture was stirred for 10 mins and then centrifuged. The precipitate was isolated by centrifuge and analyzed by XRD. As shown in FIG. 12, the XRD spectrum of the nanoparticles as synthesized showed 4 peaks (° 2θ): 36.5, 42.3, 61.5, and 73.5, all corresponding to $Cu_2O$.

The resulting core-shell particle comprising a $Cu_2O$ core and a $LaF_3$ shell is useful as a catalyst, and may be included as part of the cathode of an electrochemical cell for the conversion of carbon dioxide to an organic feedstock. The $LaF_3$ shell can protect the active catalyst sites of the core, while increasing the local concentration of $CO_2$ available for conversion.

IV. CSN Comprising a Metal Core and a Metal Halide Shell

IV(a) Synthesis and Isolation of the Metal Core

Metal nanoparticles for forming the core of the CSN may be prepared and isolated in the same manner as described in I(a) and II(a). Illustrative metals for the core include, but are not limited to, iron, cobalt, nickel, copper, and lead. In this example, the core comprised copper.

IV(b) Shell Formation

One sample (sample 1) of the isolated metal nanoparticles from IV(a) were redispersed in an aqueous solution (300 mL) under an atmosphere free of oxygen. To the aqueous solution, a solution containing $La(NO_3)_3\text{-}6H_2O$ (1 mmol) in water (60 mL) was added all at once and stirred under argon for 60 min. The sample was then isolated, the supernatant was discarded, and then the sample was re-dispersed in water (300 mL). A solution of NaF (1 mmol) in water (60 mL) was injected at 6 mL/min. The solution was stirred for 60 min and then isolated and washed twice with EtOH.

Another sample (sample 2) of the isolated metal nanoparticles from IV(a) were redispersed in an aqueous solution (300 mL) under an atmosphere free of oxygen. To the aqueous solution, a solution containing $La(NO_3)_3\text{-}6H_2O$ (2 mmol) in water (60 mL) was added all at once and stirred under argon for 60 min. The sample was then isolated, the supernatant was discarded, and then the sample was re-dispersed in water (300 mL). A solution of NaF (2 mmol) in water (60 mL) was injected at 6 mL/min. The solution was stirred for 60 min and then isolated and washed twice with EtOH.

Another sample (sample 3) of the isolated metal nanoparticles from IV(a) were redispersed in an aqueous solution (300 mL) under an atmosphere free of oxygen. To the aqueous solution, a solution containing $La(NO_3)_3\text{-}6H_2O$ (4 mmol) in water (60 mL) was added all at once and stirred under argon for 60 min. The sample was then isolated, the supernatant was discarded, and then the sample was re-dispersed in water (300 mL). A solution of NaF (4 mmol) in water (60 mL) was injected at 6 mL/min. The solution was stirred for 60 min and then isolated and washed twice with EtOH.

IV(c) Experimental Example 4

First, sample 1, sample 2, and sample 3 prepared according to IV(b) (i.e., CSNs having a copper core and an $LaF_3$ shell) were analyzed for estimated shell coverage using ICP and EDS.

To estimate shell coverage, first, full shell coverage (i.e., 100% shell coverage) was estimated based on a model wherein the shape of the CSNs was assumed to be a sphere, the size of the core was assumed to be about 50 nm, and the thickness of the $LaF_3$ shell was assumed to be about 3-5 nm. Based on this model, the estimated full shell coverage was determined to corresponded to about 12 to 17% by weight $LaF_3$ for each sample.

Then, the amount by weight of $LaF_3$ comprised by each of the three samples was measured using ICP and EDS. Based on these measurements, it was determined that sample 1 comprised about 2.1% by weight $LaF_3$, sample 2 comprised about 3.6% by weight $LaF_3$, and sample 3 comprised about 5.7% by weight $LaF_3$. By comparing these values with the amount of $LaF_3$ corresponding to estimated full shell coverage, it was determined that sample 1 comprised about 18% shell coverage, sample 2 comprised about 34% shell coverage, and sample 3 comprised about 50% shell coverage.

After percent shell coverage was estimated for each sample, the $CO_2$ adsorption and catalytic activity of each sample was studied and compared. The samples were also compared with a control comprising bare copper nanoparticles (i.e., having 0% shell coverage).

Figure 17:
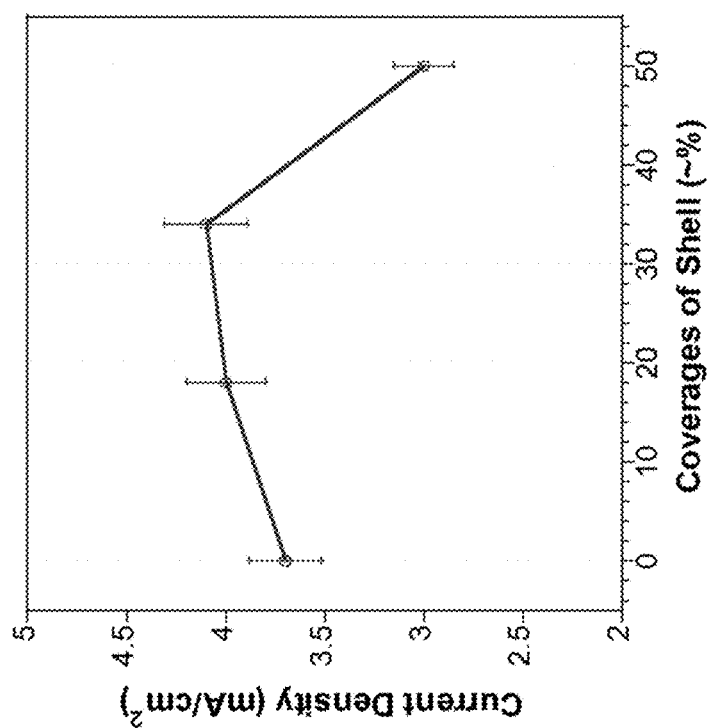
FIG. 17 shows current densities for CSNs of Experimental Example 4.

First, the current density of each sample was measured and then compared with the control. For these measurements, a cell was prepared having a glassy carbon electrode and an electrolyte comprising 0.1 M $KHCO_3$. A potential of 1.1 V vs. RHE was used. The results of these measurements are shown in FIG. 17. As can be seen by FIG. 17, the sample having about 34% shell coverage (i.e., sample 2) surprisingly provided the highest current density, which is significantly higher than the current density provided by the sample having about 50% shell coverage (i.e., sample 3).

Figure 18B:
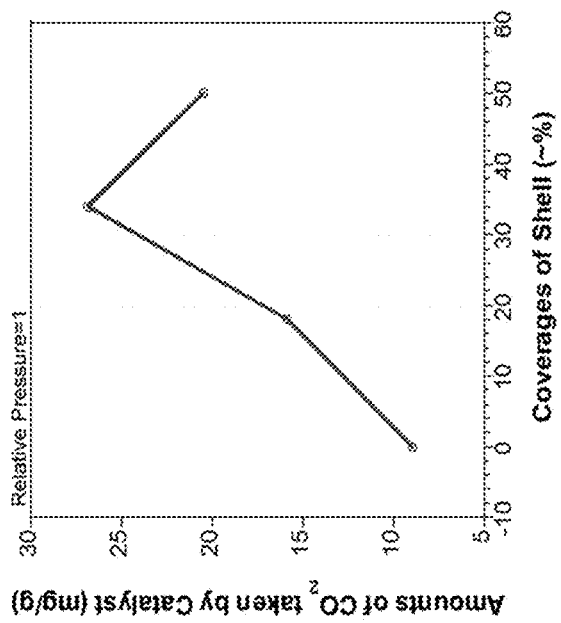
FIG. 18B shows $CO_2$ adsorption for CSNs of Experimental Example 4.
Figure 18A:
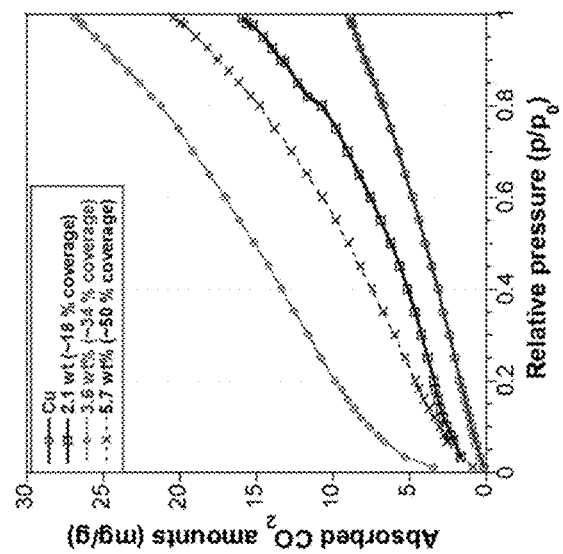
FIG. 18A shows $CO_2$ adsorption for CSNs of Experimental Example 4.

The amount of $CO_2$ (in mg/g) adsorbed by the samples was also measured. As can be seen by FIGS. 18A and 18B, the adsorption behaviors of the CSNs appeared to correlate with their measured current densities. Specifically, increased percent shell coverage corresponded to a higher $CO_2$ adsorption up to about 34% shell coverage, after which it appeared to decrease significantly. In addition, it was observed that the sample CSNs showed up to two to three-fold more $CO_2$ adsorption as compared with the control.

Finally, the intrinsic catalytic activity of the samples was compared with activities of other catalysts used for $CO_2$ conversation in the art. Specifically, the $CO_2$ conversation products provided by the samples were compared with those provided by the control along with those provided by copper cubes (both 44 nm and 63 nm) and a copper foil (as described in Loiudice, Anna, et al. "Tailoring Copper Nanocrystals towards C2 Products in Electrochemical CO2 Reduction." *Angewandte Chemie International Edition*, vol. 55, no. 19, May 2016, pp. 5789-5792.) and by a copper film (having a 3.6 μm thickness, as described in Ren, Dan, et al. "Selective Electrochemical Reduction of Carbon Dioxide to Ethylene and Ethanol on Copper(I) Oxide Catalysts." *ACS Catalysis*, vol. 5, no. 5, 2015, pp. 2814-2821). The gas products produced by each catalyst were measured using gas chromatography (GC), and the amount of alcohol produced by each catalyst was measured using high-performance liquid chromatography (HPLC), as shown in FIGS. 19A and 19B, respectively. As can be seen in FIGS. 19A and 19B, the sample CSNs produced an increased amount of alcohol products and exhibited enhanced intrinsic catalytic activity as compared with other catalysts known in the art. It should also be noted that the sample CSNs produced a combination of ethanol and n-propanol, while the catalysts known in the art produced a combination of ethanol, methanol, propanol, and allyl alcohol. This data indicates that the sample CSNs provide a higher product selectivity than other catalysts known in the art.

V. CSN Comprising a Metal Core and a Metal Hydroxide Shell

V(a) Synthesis and Isolation of the Metal Core

Metal nanoparticles for forming the core of the CSN may be prepared and isolated in the same manner as described in I(a), II(a), and IV(a). Illustrative metals for the core include, but are not limited to, iron, cobalt, nickel, copper, and lead. In this example, the core comprised copper.

IV(b) Shell Formation

One sample (sample 1) of the isolated metal nanoparticles from V(a) were redispersed in an aqueous solution (300 mL) under an atmosphere free of oxygen. To the aqueous solution, a solution containing $La(NO_3)_3\text{-}6H_2O$ (0.1 mmol) in water (60 mL) was added all at once and stirred under argon for 60 min. The sample was then isolated, the supernatant was discarded, and then the sample was re-dispersed in water (300 mL). A solution of hydrazine hydrate (1.5 mL) in water (wherein the volume of water was adjusted to equal 30 mL total) was injected at 3 mL/min. The solution was stirred for 60 min and then isolated and washed twice with EtOH.

Another sample (sample 2) of the isolated metal nanoparticles from V(a) were redispersed in an aqueous solution (300 mL) under an atmosphere free of oxygen. To the aqueous solution, a solution containing $La(NO_3)_3\text{-}6H_2O$ (1.0 mmol) in water (60 mL) was added all at once and stirred under argon for 60 min. The sample was then isolated, the supernatant was discarded, and then the sample was re-dispersed in water (300 mL). A solution of hydrazine hydrate (2 mL) in water (wherein the volume of water was adjusted to equal 30 mL total) was injected at 3 mL/min. The solution was stirred for 60 min and then isolated and washed twice with EtOH.

Another sample (sample 3) of the isolated metal nanoparticles from V(a) were redispersed in an aqueous solution (300 mL) under an atmosphere free of oxygen. To the aqueous solution, a solution containing $La(NO_3)_3\text{-}6H_2O$ (2 mmol) in water (60 mL) was added all at once and stirred under argon for 60 min. The sample was then isolated, the supernatant was discarded, and then the sample was re-dispersed in water (300 mL). A solution of hydrazine hydrate (3 mL) in water (wherein the volume of water was adjusted to equal 30 mL total) was injected at 3 mL/min. The solution was stirred for 60 min and then isolated and washed twice with EtOH.

V(c) Experimental Example 5

First, sample 1, sample 2, and sample 3 prepared according to IV(b) (i.e., CSNs having a copper core and an $La(OH)_3$ shell) were analyzed for estimated shell coverage in the manner described in IV(c). It was determined that sample 1 comprised about 10% shell coverage, sample 2 comprised about 24% shell coverage, and sample 3 comprised about 47% shell coverage After percent shell coverage was estimated for each sample, the $CO_2$ adsorption and catalytic activity of each sample was studied and compared in the manner described in IV(c).

Figure 20:
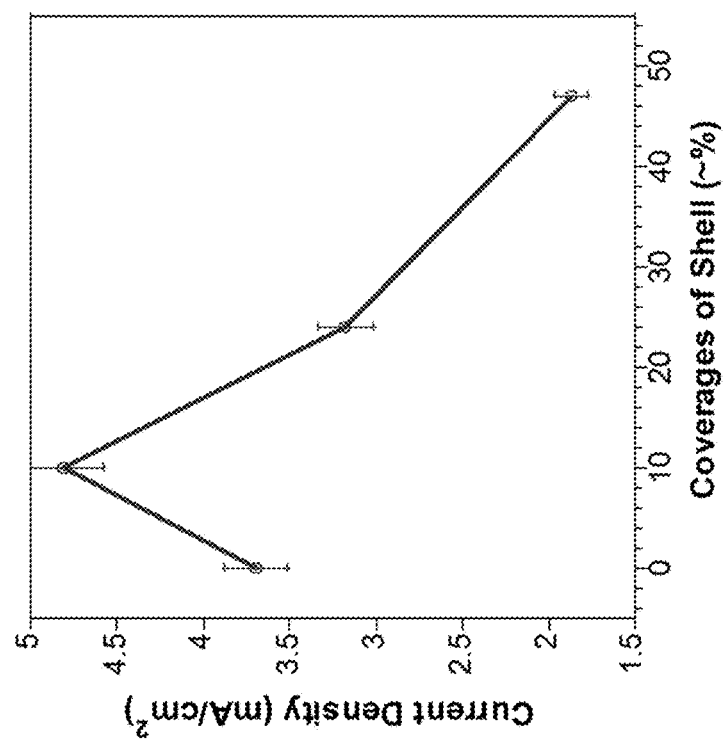
FIG. 20 shows current densities for CSNs of Experimental Example 5.

As can be seen by FIG. 20, the sample having about 10% shell coverage (i.e., sample 1) surprisingly provided the highest current density, which is significantly higher than the current density provided by the control, the sample having about 24% shell coverage (i.e., sample 2), and the sample having about 47% shell coverage (i.e., sample 3).

Figure 21B:
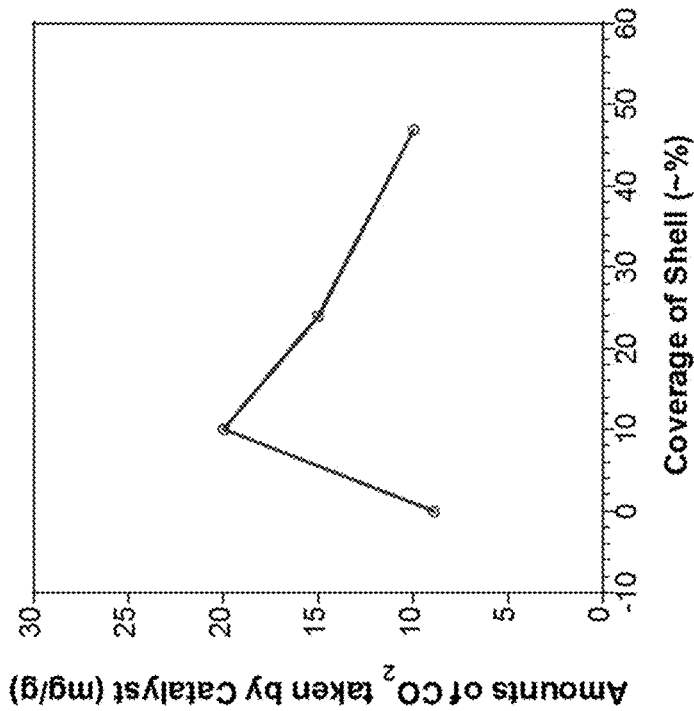
FIG. 21B shows $CO_2$ adsorption for CSNs of Experimental Example 5.
Figure 21A:
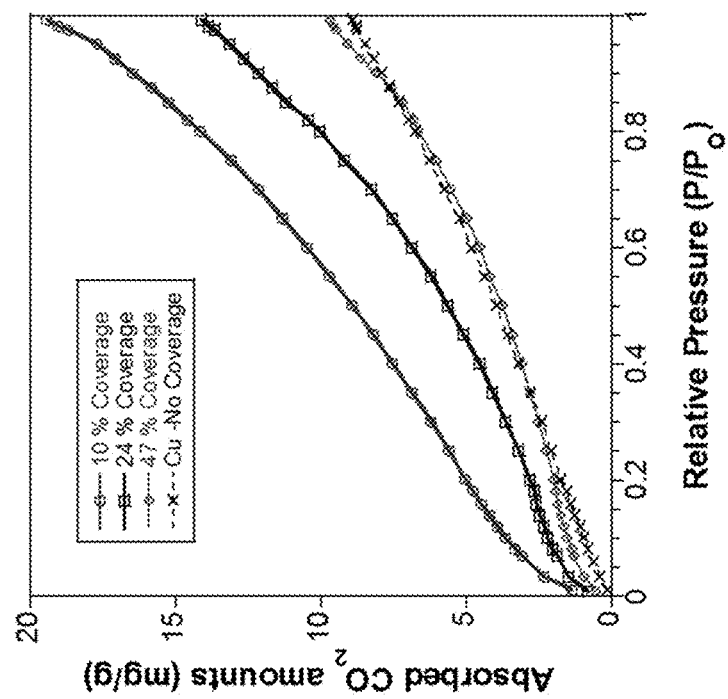
FIG. 21A shows $CO_2$ adsorption for CSNs of Experimental Example 5.

The amount of $CO_2$ (in mg/g) adsorbed by the samples was also measured. As can be seen by FIGS. 21A and 21B, the adsorption behaviors of the CSNs appeared similar to their measured current densities. Specifically, increased percent shell coverage corresponded to a higher $CO_2$ adsorption up to about 10% shell coverage, after which it decreased. However, the $CO_2$ adsorption provided by the CSNs having about 24% shell coverage was still greater than the $CO_2$ adsorption provided by bare copper nanoparticles (i.e., the control.

Finally, $CO_2$ conversation products provided by the samples were measured in the manner described in IV(c). Specifically, as can be seen in FIG. 22, the sample CSNs having an $La(OH)_3$ shell produced an amount of alcohol products (i.e., ethanol and n-propanol) that was similar to the amounts produced by the CSNs described in IV (i.e., having an $LaF_3$ shell, as shown in FIG. 19B). It was thus determined that, similar to the CSNs having an $LaF_3$ shell, CSNs having an $La(OH)_3$ shell also provide an increased amount of alcohol products and exhibit enhanced intrinsic catalytic activity as compared with other catalysts known in the art.

Comparative Example 2

An attempt was made to make a CSN including a core comprising a copper nanoparticle coated with a shell comprising lanthanum fluoride ($Cu/LaF_3$). Comparative Example 2 was performed identically to Experimental Example 1, except that 1 mmol $LaCl_3.7H_2O$ was used instead of $La(NO_3)_3.6H_2O$.

Figure 13:
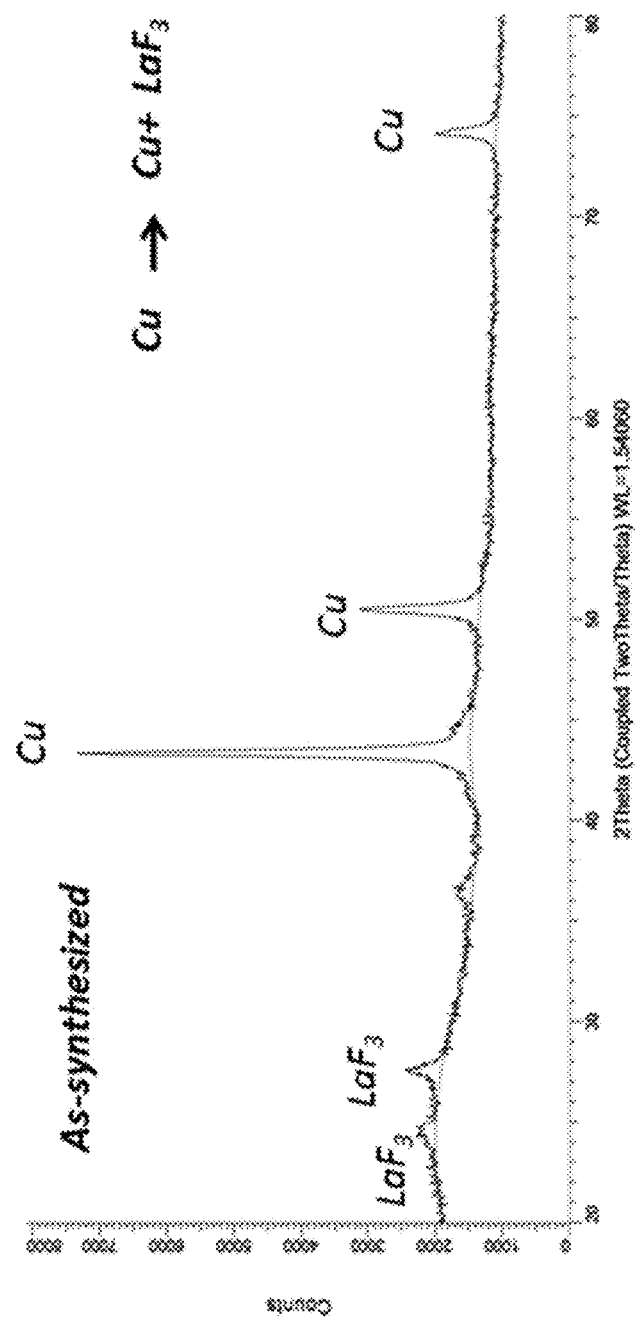
FIG. 13 shows an XRD spectrum of nanoparticles of Comparative Example 2 as synthesized.

The XRD spectrum of the nanoparticles as synthesized in Comparative Example 2 is shown in FIG. 13. The XRD spectrum shows 5 peaks (° 2θ): 24.5 ($LaF_3$), 27.6 ($LaF_3$), 43.6 (Cu), 50.5 (Cu), 74.1 (Cu). Therefore, the Cu remains during the course of the reaction of $LaCl_3$ and NaF.

Figure 14:
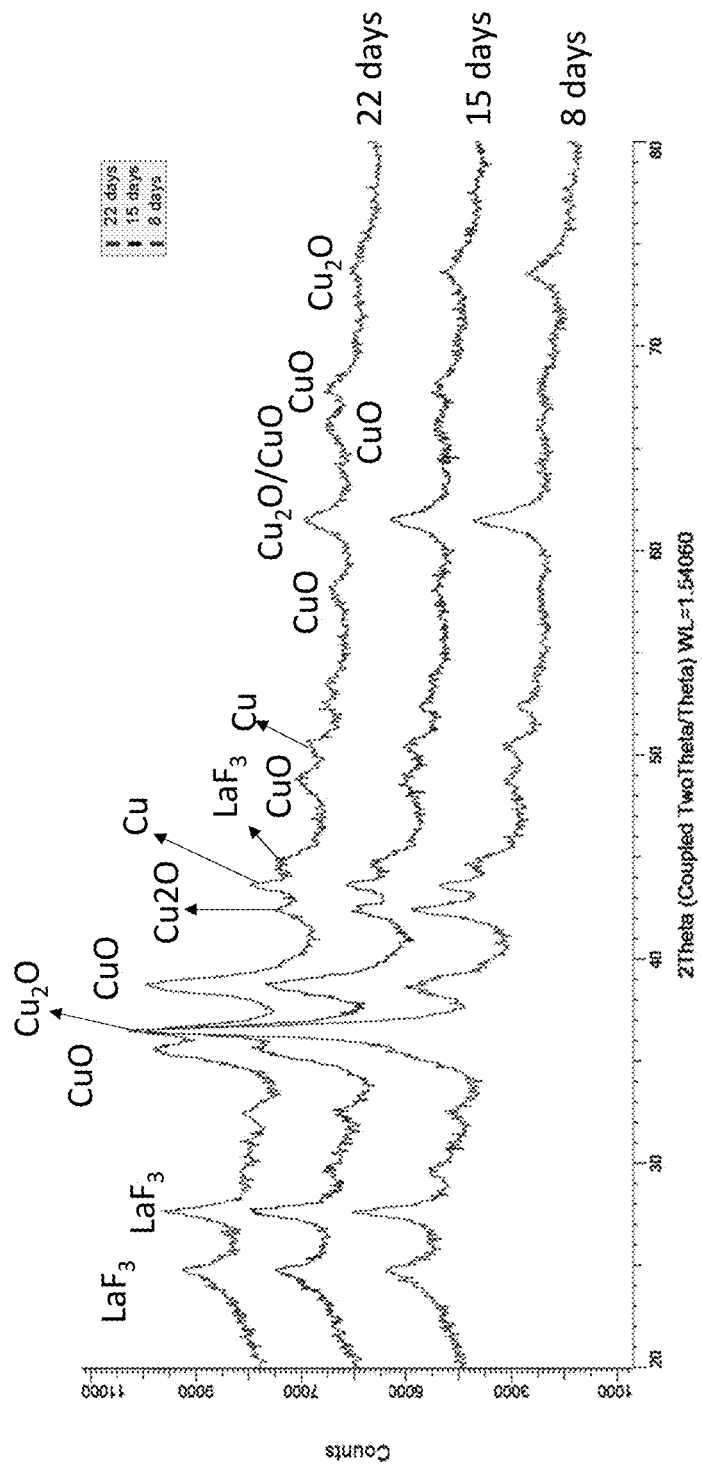
FIG. 14 shows stacked XRD spectra of nanoparticles of Comparative Example 2 after exposure to air for 8, 15, and 22 days.
Figure 15:
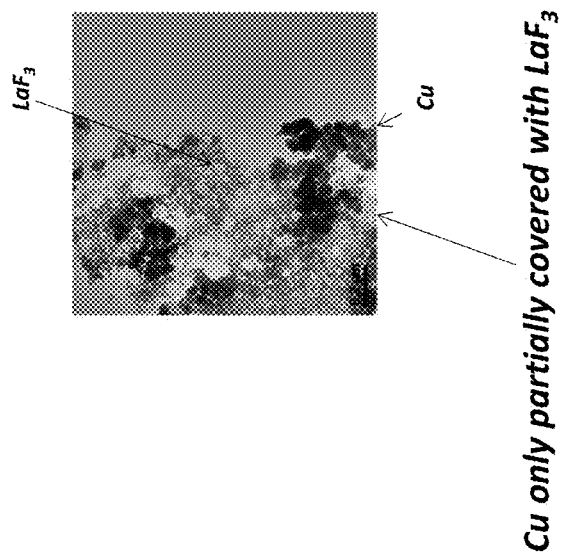
FIG. 15 is a TEM image of the nanoparticles of Comparative Example 2 showing inhomogeneous, partial coverage of copper nanoparticles with LaF3, as well as LaF3 that is not associated with copper nanoparticles.

However, oxidation of the Cu following exposure of the CSNs of Comparative Example 2 indicated that the shell was not properly formed. FIG. 14 shows stacked XRD spectra of the nanoparticles synthesized in Comparative Example 2 upon exposure to air for 8, 15, and 22 days. Additional peaks are observed starting at 8 days (°2θ): 35.4, 36.4, 38.8, 42.5, 44.8, 48.7, 52.3, 61.5, 73.5. At least the peaks at 36.4, 42.5, 61.5, and 73.5°2θ are consistent with $Cu_2O$ formation. The peaks at 43.6, 50.5, and 74.1°2θ, which are consistent with Cu, have also diminished in intensity. As shown in FIG. 15, the TEM image shows inhomogeneous, partial coverage of Cu nanoparticles with $LaF_3$, as well as $LaF_3$ that is not associated with Cu nanoparticles. Accordingly, shells made with $LaCl_3.7H_2O$ do not result in a desirable core-shell composition as it would leave the Cu core exposed to the environment of an electrochemical cell. In addition, the $LaF_3$ that is not associated with Cu nanoparticles would decrease the overall efficiency of any system incorporating the mixture.

Comparative Example 3

Figure 16:
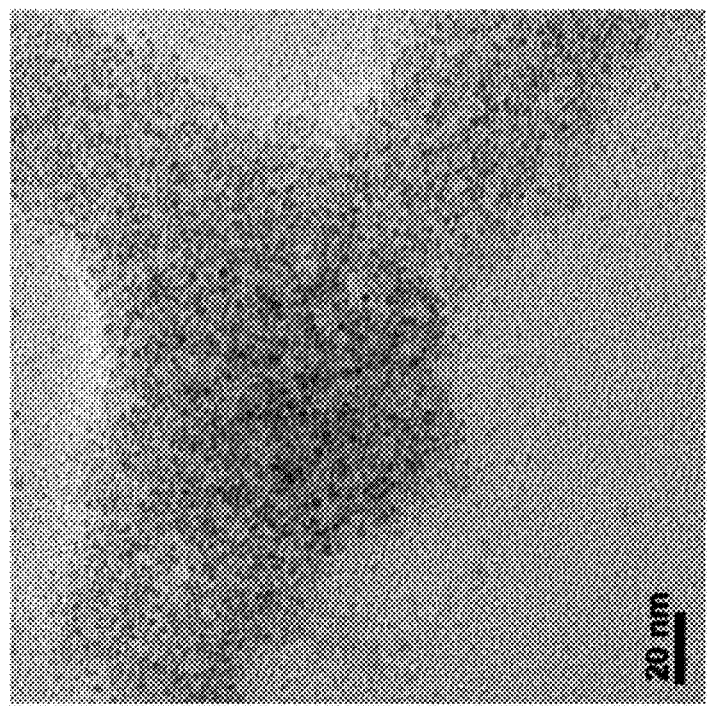
FIG. 16 is a TEM image of the nanoparticles of Comparative Example 3 showing that the Cu nanoparticles were broken down into smaller Cu nanoparticles, and that the core shell structures were not formed.

An attempt was made to make a CSN comprising a core comprising a copper oxide nanoparticle coated with a shell comprising lanthanum fluoride ($CuOx/LaF_3$). Comparative Example 3 was performed identically to Comparative Example 2, except that after stirring for 1.5 hrs with hydrazine, CTAB, and citric acid, the copper nanoparticles were not isolated from the synthesis mixture, and 1 mmol $LaCl_3.7H_2O$ was added to the copper nanoparticle synthesis mixture. As shown in FIG. 16, TEM images show that the copper nanoparticles were broken down into smaller copper nanoparticles, and that core shell structures were not formed. Accordingly, shells made with $LaCl_3 \cdot 7H_2O$ do not result in a desirable core-shell composition.

What is claimed is:

1. A nanoparticle comprising:
   a catalytic core component encompassed by and in contact with an outermost shell;
   wherein the catalytic core component comprises at least one unoxidized metal as an innermost portion thereof;
   wherein the outermost shell comprises at least one compound of lanthanum, cerium, calcium, magnesium, or manganese having a halogen and/or an oxygen atom, and
   wherein the at least one unoxidized metal is coated by a metal oxide.

2. The nanoparticle according to claim 1, wherein the at least one compound is selected from the group consisting of a fluoride, an oxide, an oxyfluoride, and a hydroxide.

3. The nanoparticle according to claim 1, wherein the at least one unoxidized metal is selected from the group consisting of iron, cobalt, nickel, copper, lead, tin, and combinations thereof.

4. The nanoparticle according to claim 1, wherein the catalytic core component is solid.

5. A nanoparticle comprising:
   a catalytic core component encompassed by and in contact with an outermost shell,
   wherein the catalytic core component comprises at least one unoxidized metal as an innermost portion thereof;
   wherein the outermost shell comprises at least one compound of lanthanum, cerium, calcium, magnesium, or manganese having a halogen and/or an oxygen atom;
   wherein the at least one unoxidized metal is coated by a metal oxide; and
   wherein the catalytic core component is hollow.

6. The nanoparticle according to claim 1, wherein the at least one compound is selected from the group consisting of $LaF_3$, $La(OH)_3$, $CeF_3$, $CaF_2$, $MgF_2$, $LaOF$, $CeOF$, $La_2O_3$, and $CeO_2$.

7. The nanoparticle according to claim 1, wherein the at least one compound is more than one compound.

8. The nanoparticle according to claim 1, wherein the outermost shell completely covers the surface area of the catalytic core component.

9. The nanoparticle according to claim 1, wherein the outermost shell partially covers the surface area of the catalytic core component.

10. The nanoparticle according to claim 9, wherein the nanoparticle has from about 25 to 45% shell coverage.

11. The nanoparticle according to claim 9, wherein the nanoparticle has from about 1 to 20% shell coverage.

12. An electrochemical cell comprising:
    an anode,
    a cathode, and
    a liquid electrolyte;
    wherein the cathode comprises an electrocatalytic component, the electrocatalytic component including at least one nanoparticle according to claim 1;
    wherein the catalytic core component is capable of chemically reducing carbon dioxide.

13. The electrochemical cell according to claim 12, wherein the cell chemically reduces carbon dioxide when the cell is energized.

14. The electrochemical cell according to claim 12, wherein the at least one compound is selected from a fluoride, an oxide, an oxyfluoride, and a hydroxide.

15. An electrode comprising an electrocatalytic component, the electrocatalytic component including a nanoparticle according to claim 1;
    wherein the catalytic core component is capable of chemically reducing carbon dioxide.

* * * * *